(12) United States Patent
Kageyama

(10) Patent No.: US 8,965,797 B2
(45) Date of Patent: Feb. 24, 2015

(54) EXPLOSIONS OF BILL-OF-MATERIALS LISTS

(75) Inventor: Yasuyuki Kageyama, Chiba-ken (JP)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 13/554,353

(22) Filed: Jul. 20, 2012

(65) Prior Publication Data

US 2013/0054427 A1 Feb. 28, 2013

(30) Foreign Application Priority Data

Aug. 22, 2011 (JP) ................................ 2011-180999

(51) Int. Cl.
*A01K 5/02* (2006.01)
*G06F 17/50* (2006.01)
*G06G 1/14* (2006.01)
(Continued)

(52) U.S. Cl.
CPC .......... *G06Q 10/0875* (2013.01); *G06Q 10/087* (2013.01); *G06Q 10/06* (2013.01); *G06Q 30/04* (2013.01); *G06Q 40/10* (2013.01);
(Continued)

(58) Field of Classification Search
CPC . G06Q 10/08; G06Q 10/087; G06Q 10/0875; G06Q 10/06; G06Q 20/202; G06Q 20/203; G06Q 30/04; G06Q 30/06; G06Q 40/10
USPC .................................................... 705/29, 22
See application file for complete search history.

(56) References Cited

U.S. PATENT DOCUMENTS 5,197,001 A * 3/1993 Mukherjee ...................... 705/29
5,307,261 A * 4/1994 Maki et al. ...................... 705/29
(Continued)

FOREIGN PATENT DOCUMENTS

JP 9050459 A 2/1997
JP 11203327 A 7/1999
(Continued)

OTHER PUBLICATIONS

Configuration for Logistics co-ordination, Caputo Mauro; Int Journal of Physical Dist, vol. 28 Issue 5 1998 pp. 349-376.*
(Continued)

*Primary Examiner* — Matthew Gart
*Assistant Examiner* — Harshad Parikh
(74) *Attorney, Agent, or Firm* — Patrick J. Daughtery; Driggs, Hogg, Daugherty & Del Zoppo Co., LPA

(57) ABSTRACT

In a parallel explosion unit of a parallel explosion apparatus, a processing unit extracts an end product, extracts an assembly directly constituting the end product, and an determines whether or not a BOM tree having the assembly as a vertex is already broken down. When the BOM tree of the assembly is not yet broken down, the processing unit registers the number of units of each component constituting the assembly in an explosion result list and generates a tree-specific list in which the number of units of each component and a registration position of the component in the explosion result list are recorded. When the BOM tree of the assembly is already broken down, the processing unit adds the number of units of each component recorded in the tree-specific list to the number of units at the registration position of the component likewise recorded in the explosion result list.

10 Claims, 15 Drawing Sheets

(51) Int. Cl.
- *G06Q 20/00* (2012.01)
- *G06Q 10/08* (2012.01)
- *G06Q 10/06* (2012.01)
- *G06Q 30/04* (2012.01)
- *G06Q 40/00* (2012.01)
- *G06Q 20/20* (2012.01)
- *G06Q 30/06* (2012.01)

(52) U.S. Cl.
CPC ............. *G06Q 20/203* (2013.01); *G06Q 10/08* (2013.01); *G06Q 30/06* (2013.01); *G06Q 20/202* (2013.01)
USPC .............................................. 705/29; 705/22

(56) References Cited

U.S. PATENT DOCUMENTS

| | | | |
|---|---|---|---|
| 5,434,791 A * | 7/1995 | Koko et al. ...................... 700/97 |
| 5,970,465 A * | 10/1999 | Dietrich et al. ............. 705/7.22 |
| 6,041,268 A | 3/2000 | Jin ................................ 700/107 |
| 6,226,561 B1 * | 5/2001 | Tamaki et al. ................ 700/100 |
| 6,516,301 B1 * | 2/2003 | Aykin .......................... 705/7.25 |
| 6,823,226 B2 * | 11/2004 | Clemens et al. ................ 700/99 |
| 6,885,902 B2 * | 4/2005 | Crampton et al. ............... 700/99 |
| 7,096,173 B1 * | 8/2006 | Rappaport et al. ............. 703/13 |
| 7,512,553 B2 * | 3/2009 | Chidiac et al. ................. 705/28 |
| 7,558,793 B1 * | 7/2009 | Topolovac et al. ..................... 1/1 |
| 7,593,885 B2 * | 9/2009 | Du Preez et al. ............... 705/37 |
| 7,610,259 B2 * | 10/2009 | Yuda et al. ............................ 1/1 |
| 7,610,286 B1 * | 10/2009 | Yu et al. ............................... 1/1 |
| 7,653,452 B2 * | 1/2010 | Sauermann et al. .......... 700/106 |
| 7,801,916 B1 * | 9/2010 | Topolovac et al. ............ 707/783 |
| 7,933,673 B2 * | 4/2011 | Brown et al. .................... 700/99 |
| 8,015,052 B2 * | 9/2011 | Woehler ....................... 705/7.25 |
| 8,050,789 B2 * | 11/2011 | Elhanan et al. ............... 700/121 |
| 8,086,337 B1 * | 12/2011 | Green et al. .................. 700/107 |
| 8,600,841 B2 * | 12/2013 | Cheng et al. ................... 705/28 |
| 2003/0126024 A1 * | 7/2003 | Crampton et al. ............. 705/22 |
| 2004/0098151 A1 * | 5/2004 | Carlucci et al. ............... 700/95 |
| 2004/0181506 A1 * | 9/2004 | Hsiang .............................. 707/1 |
| 2004/0193500 A1 * | 9/2004 | Brown et al. ................... 705/22 |
| 2004/0243491 A1 * | 12/2004 | Hsiang ............................ 705/34 |
| 2005/0080690 A1 * | 4/2005 | Sauermann et al. ........... 705/29 |
| 2005/0125311 A1 * | 6/2005 | Chidiac et al. ................. 705/28 |
| 2005/0131779 A1 * | 6/2005 | Kitamura et al. ............... 705/29 |
| 2005/0154704 A1 * | 7/2005 | Yuda et al. ........................ 707/1 |
| 2005/0273401 A1 * | 12/2005 | Yeh et al. ....................... 705/29 |
| 2005/0278296 A1 * | 12/2005 | Bostwick .......................... 707/1 |
| 2005/0283412 A1 * | 12/2005 | Cheng et al. ................... 705/28 |
| 2006/0116937 A1 * | 6/2006 | Seaman et al. ................. 705/29 |
| 2006/0190364 A1 * | 8/2006 | Bizovi et al. ................... 705/29 |
| 2006/0212151 A1 * | 9/2006 | Taguchi .......................... 700/99 |
| 2007/0117567 A1 * | 5/2007 | Rappaport et al. ............ 455/446 |
| 2007/0282779 A1 * | 12/2007 | Haimov .......................... 706/57 |
| 2007/0288306 A1 * | 12/2007 | Ohishi et al. ................... 705/11 |
| 2008/0021797 A1 * | 1/2008 | Moeller .......................... 705/29 |
| 2008/0040186 A1 * | 2/2008 | Brown et al. ..................... 705/8 |
| 2008/0114660 A1 * | 5/2008 | Berkooz et al. ................ 705/23 |
| 2008/0126788 A1 * | 5/2008 | Kreek et al. .................. 713/100 |
| 2008/0215410 A1 * | 9/2008 | Cheng et al. ...................... 705/8 |
| 2008/0297504 A1 * | 12/2008 | Fraser et al. ................. 345/420 |
| 2009/0125414 A1 * | 5/2009 | Kleinrock et al. ............. 705/26 |
| 2009/0216357 A1 * | 8/2009 | Elhanan et al. ................ 700/98 |
| 2009/0276275 A1 * | 11/2009 | Brown et al. ..................... 705/8 |
| 2009/0281651 A1 * | 11/2009 | Knapp et al. ................. 700/107 |
| 2010/0057729 A1 * | 3/2010 | Fitt ................................... 707/5 |
| 2010/0082138 A1 * | 4/2010 | Hayes et al. ................... 700/99 |
| 2010/0153154 A1 * | 6/2010 | Bergantino et al. .............. 705/7 |
| 2010/0161364 A1 * | 6/2010 | Lokowandt et al. ............. 705/8 |
| 2010/0161365 A1 * | 6/2010 | Lokowandt et al. ............. 705/8 |
| 2011/0112679 A1 * | 5/2011 | Srinivasan et al. ........... 700/107 |
| 2011/0246250 A1 * | 10/2011 | Abraham et al. ............. 705/7.12 |
| 2011/0246256 A1 * | 10/2011 | Zhu ............................. 705/7.23 |
| 2012/0204104 A1 * | 8/2012 | Walsh ........................... 715/273 |
| 2012/0233533 A1 * | 9/2012 | Yucel et al. ................... 715/212 |
| 2012/0317543 A1 * | 12/2012 | Baudel et al. ................. 717/105 |
| 2013/0036221 A1 * | 2/2013 | Pishevar et al. .............. 709/224 |
| 2013/0054427 A1 * | 2/2013 | Kageyama ...................... 705/29 |
| 2013/0144416 A1 * | 6/2013 | Rataul ............................ 700/95 |
| 2013/0227504 A1 * | 8/2013 | Braithwaite et al. .......... 716/106 |
| 2013/0246451 A1 * | 9/2013 | Kaiser ........................... 707/769 |
| 2013/0246481 A1 * | 9/2013 | Kaiser ........................... 707/803 |
| 2014/0031966 A1 * | 1/2014 | Cheng et al. .................. 700/107 |

FOREIGN PATENT DOCUMENTS

| | | |
|---|---|---|
| JP | 11213007 A | 8/1999 |
| JP | 2001142929 A | 5/2001 |
| JP | 2002073708 A | 3/2002 |
| JP | 2003281197 A | 10/2003 |
| JP | 2003281199 A | 10/2003 |
| JP | 2003281203 A | 10/2003 |
| JP | 3470248 B2 | 11/2003 |
| JP | 4027904 B2 | 12/2007 |
| JP | 2009265706 A | 11/2009 |

OTHER PUBLICATIONS

Integrating Hierarchically significant part numbers to BOM by Ranjan Bailur Kini; Texas Tech University, Thesis, 1985.*
IBM, Design Method for Parallel BOM Explosion, IPCOM000179035D, Feb. 5, 2009, pp. 1-8.

* cited by examiner

HASH TABLE

FIG. 3A

|   | END PRODUCT A | END PRODUCT B |
|---|---|---|
| 0 | P1 |  |
| 0 |  | P1' |
| 1 | P2 |  |
| 1 |  | P2' |
| 2 | P3 | P3 |
| 2 | P4 | P4 |
| 1 | P3 | P3 |

FIG. 3B

|   |   | END PRODUCT A | END PRODUCT B |
|---|---|---|---|
| 0 | P1 | 1 | 0 |
| 0 | P1' | 0 | 1 |
| 1 | P2 | 2 | 0 |
| 1 | P2' | 0 | 6 |
| 2 | P3 | 6 | 12 |
| 2 | P4 | 8 | 30 |
| 1 | P3 | 5 | 4 |

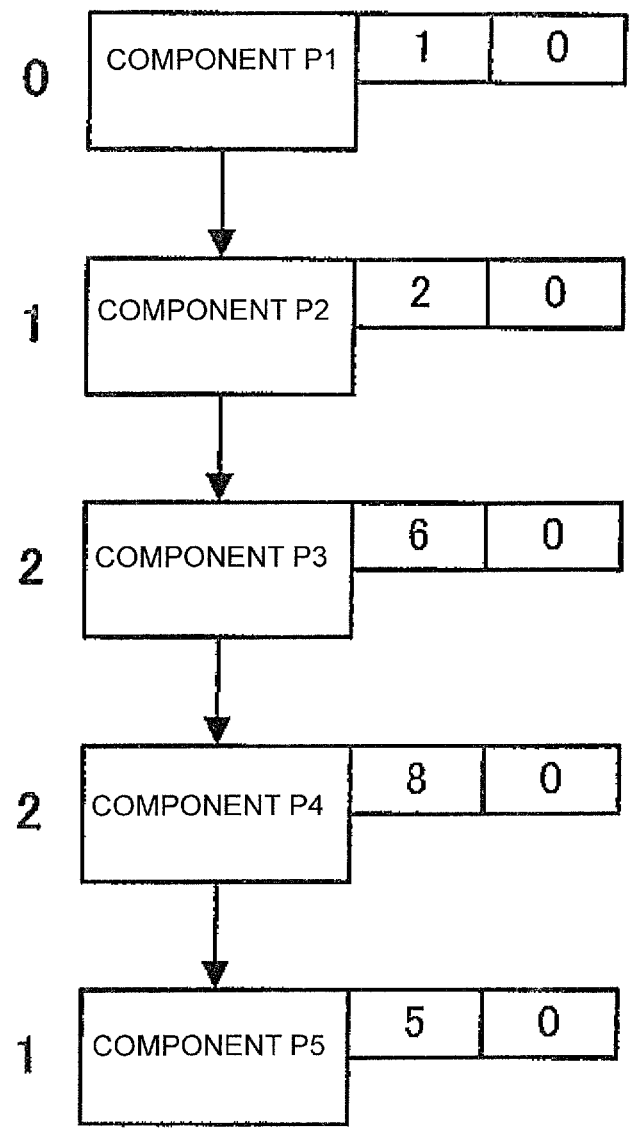
F.G 4

DICTIONARY

FIG. 9A

|   |    | A | B |
|---|----|---|---|
| 0 | M1 | 1 |   |
| 1 | P1 | 4 |   |
| 1 | P2 | 3 |   |

FIG. 9B

|   |    | A | B |
|---|----|---|---|
| 0 | M1 | 1 | 0 |
| 1 | P1 | 4 | 0 |
| 1 | P2 | 3 | 0 |

FIG. 9C

|   |    | A | B |
|---|----|---|---|
| 0 | M1 | 1 | 0 |
| 0 | M2 | 1 |   |
| 1 | P1 | 5 | 0 |
| 1 | P2 | 3 | 0 |
| 1 | P3 | 2 |   |

FIG. 9D

|   |    | A | B |
|---|----|---|---|
| 0 | M1 | 1 | 1 |
| 0 | M2 | 1 | 1 |
| 1 | P1 | 5 | 5 |
| 1 | P2 | 3 | 3 |
| 1 | P3 | 2 | 2 |

FIG. 9E

|   |    | A | B |
|---|----|---|---|
| 0 | M1 | 1 | 1 |
| 0 | M2 | 1 | 1 |
| 0 | M3 | 0 | 1 |
| 1 | P1 | 5 | 5 |
| 1 | P2 | 3 | 6 |
| 1 | P3 | 2 | 2 |
| 1 | P4 | 0 | 2 |

FIG. 10

|   |    | A | B |
|---|----|---|---|
| 0 | M1 | 1 | 0 |
| 0 | M2 | 1 | 1 |
| 0 | M3 | 0 | 1 |
| 1 | P1 | 5 | 1 |
| 1 | P2 | 3 | 3 |
| 1 | P3 | 2 | 2 |
| 1 | P4 | 0 | 2 |

EXPLOSIONS OF BILL-OF-MATERIALS LISTS

BACKGROUND

The present invention relates apparatuses and methods for explosions of bill-of-materials (BOM) lists.

Assembled industrial products such as automobiles having a lot of options and variations include similar products having the same basic structure but being just partially different due to a partial specification difference. In promoting common use of components to enhance the efficiency of designing and development, it is useful to compare component configurations of such similar products in the course of work and thereby to know which part is the same and which part is different in the component configurations as efficiently as possible.

BRIEF SUMMARY

In one embodiment of the present invention, a method is provided for performing parallel explosions of bill-of-materials lists of a plurality of products in a way that a number of units of each of a plurality of components constituting each of the plurality of products is arranged in an area corresponding to the component. The method includes a processing unit selecting a particular component as directly constituting a particular product among the plurality of products. The method also includes the processing unit determining whether or not a bill-of-materials list of the selected particular component is already broken down. if determined that the bill-of-materials list of the selected particular component is not yet broken down, the processing unit breaks down the bill-of-materials list of the particular component into parallel explosion information and bill-of-materials explosion information. The parallel explosion information comprises a number of units of each of a plurality of components constituting the particular component stored at a position corresponding to the particular product in an area corresponding to the component. The bill-of-materials explosion information comprises information specifying the number of units of each of the components and an area corresponding to each of the components in the parallel explosion information. If determined that the bill-of-materials list of the particular component is already broken down, the processing unit adds the number of units of each of the components included in the bill-of-materials explosion information to the number of units stored in a position in the parallel explosion information that corresponds to the particular product in an area specified as corresponding to the component based on the information included in the bill-of-materials explosion information.

In another embodiment, a system has a processing unit, computer readable memory and a tangible computer-readable storage medium with program instructions, wherein the processing unit, when executing the stored program instructions, performs parallel explosions of bill-of-materials lists of a plurality of products in a way that the number of units of each of components constituting each of the plurality of products is arranged in an area corresponding to the component. More particularly, the processing unit thereby selects a particular component directly as constituting a particular product among the plurality of products, and determines whether or not a bill-of-materials list of the selected particular component is already broken down. If the bill-of-materials list is not yet broken down, the processing unit breaks down the bill-of-materials list of the particular component into a parallel explosion list and a bill-of-materials explosion list. The parallel explosion list comprises a plurality of nodes respectively representing the components constituting the plurality of products, and the number of units of each of the components stored in a position corresponding to the particular product in an array corresponding to the node representing the component among the plurality of nodes. The bill-of-materials explosion list comprises a plurality of nodes respectively representing components constituting the particular component, the number of units of each of the components, and information specifying the node of the component in the parallel explosion list registered in the node representing the component among the plurality of nodes. If the bill-of-materials list of the particular component is already broken down, the processing unit adds the number of units of the component registered in each of the nodes included in the bill-of-materials explosion list to the number of units stored in a position corresponding to the particular product in an array corresponding to the node in the parallel explosion list, wherein the node is specified as representing the component based on the information registered in each of the nodes included in the bill-of-materials explosion list.

In another embodiment, an article of manufacture has a tangible computer-readable storage medium with computer readable program code embodied therewith, the computer readable program code comprising instructions that, when executed by a computer processing unit, cause the computer processing unit to perform parallel explosions of bill-of-materials lists of a plurality of products in a way that the number of units of each of components constituting each of the plurality of products is arranged in an area corresponding to the component. More particularly, the processing unit thereby selects a particular component directly as constituting a particular product among the plurality of products, and determines whether or not a bill-of-materials list of the selected particular component is already broken down. If the bill-of-materials list is not yet broken down, the processing unit breaks down the bill-of-materials list of the particular component into a parallel explosion list and a bill-of-materials explosion list. The parallel explosion list comprises a plurality of nodes respectively representing the components constituting the plurality of products, and the number of units of each of the components stored in a position corresponding to the particular product in an array corresponding to the node representing the component among the plurality of nodes. The bill-of-materials explosion list comprises a plurality of nodes respectively representing components constituting the particular component, the number of units of each of the components, and information specifying the node of the component in the parallel explosion list registered in the node representing the component among the plurality of nodes. If the bill-of-materials list of the particular component is already broken down, the processing unit adds the number of units of the component registered in each of the nodes included in the bill-of-materials explosion list to the number of units stored in a position corresponding to the particular product in an array corresponding to the node in the parallel explosion list, wherein the node is specified as representing the component based on the information registered in each of the nodes included in the bill-of-materials explosion list.

BRIEF DESCRIPTION OF THE SEVERAL VIEWS OF THE DRAWINGS

FIGS. 3A and 3B are diagrams showing modes of showing results of parallel explosions of the BOM trees.

FIG. 4 is a diagram showing examples in an explosion result list generated from the BOM trees.

FIGS. 9A, 9B, 9C, 9D and 9E are tables showing explosion results obtained by copying all of the numbers of the units of each component in broken down columns in the second implementation example.

FIG. 10 is a table showing an explosion result obtained by copying only a necessary number of units of each component in the broken down columns in the second implementation example.

DETAILED DESCRIPTION

Figure 1A:
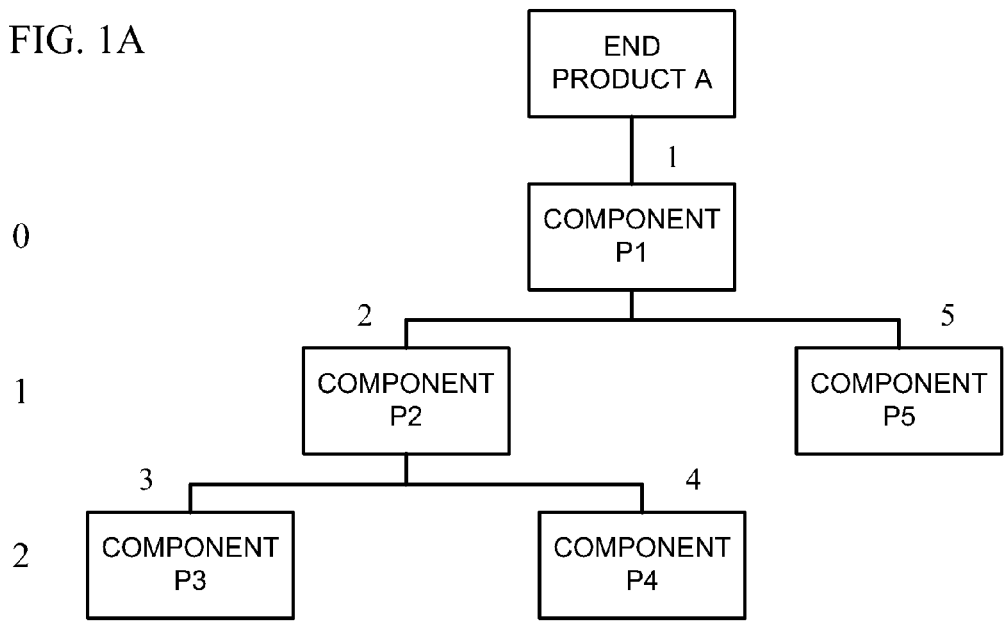
FIGS. 1A and 1B are diagrams showing examples of BOM trees for parallel explosions.

A BOM list explosion frequently uses a list in which an end product as a vertex of a BOM tree is broken down into components. However, simply arranging results of explosions of individual BOM trees side by side is not sufficient to extract the same parts and different parts in the multiple BOM trees, and thus this technique is not appropriate for comparative study. Hence, a first parallel explosion method is used in which parts having the same component configuration are merged into one and parts having different component configurations are broken down into components in a parallelized table showing differences in configuration. In this method, the merging logic differs depending on the work, but the whole explosion results are generally displayed in a mode where rows are associated with components as the explosion results and columns are associated with end products or assemblies at one level lower than the end products.

However, if the entire logic of a parallel explosion of the BOM lists is implemented by use of a structured query language (SQL), the explosion requires a long processing time and includes a lot of unnecessary processing because the same data is repeatedly accessed. Hence, use of the following second parallel explosion method is also conceivable. Specifically, only necessary data is first read from data on components and component configurations in a database, and a BOM tree graph data structure based on an adjacency list structure is built up in a memory for all the BOM trees to be parallelized. Next, the BOM trees are broken down by utilizing this data structure. An explosion result list of the explosion of the first BOM tree is used as a key list. Then, instead of the first BOM tree itself, the key list is used to search for the same component as a component in explosion results of the second and following BOM trees, and to hold therein information on the components. Since all of information on the same components and different components for the parallelization is registered in the key list, a result can be outputted from this in any necessary mode.

Examples of a technique focusing on common components and non-common components in Patent Publications include a technique in Japanese Patent Application Publication No. 2009-265706.

In the technique in Japanese Patent Application Publication No. 2009-265706, components of products forming product groups are analyzed in function and attribute and classified into common components and non-common components. Functions of the non-common components are classified into common functions and non-common functions. Then, improvement guides for creating a structure of each of non-common components with minimum cost are generated based on a material and a construction method satisfying the attribute of the component.

Examples of techniques for management of a BOM list include techniques in Japanese Patent Application Publication No. Hei 11-203327, Japanese Patent Application Publication No. 2002-73708, and Japanese Patent Application Publication No. 2003-281199.

In the technique in Japanese Patent Application Publication No. Hei 11-203327, a configuration information acquiring unit acquires configuration information of product models from a configuration information table in a storage unit in which configuration information of the products is stored. A configuration information compiling unit compiles the acquired configuration information of the multiple similar product models into a single multiple-model BOM list. A component information editing unit edits the multiple-model BOM list. When receiving the multiple-model BOM list edited by the component information editing unit, a configuration information dividing unit divides the multiple-model BOM list, by model on the basis of quantity columns, into records having columns of a parent product name, a product name, and a quantity; converts the structure of the multiple-model BOM list into a structure allowing storage of the component configuration in the configuration information table; and registers data in the configuration information table, while omitting duplicated records among multiple models.

With the technique in Japanese Patent Application Publication No. 2002-73708, a parts information system has a BOM list database, a workflow management function, a schedule management function, and a BOM list explosion function. The BOM list database integrally manages BOM list data created in processes (designing, concept planning, engineering, and production) of product development in association with each other, and holds CAD data, document data, and parts catalog data further associated with the BOM list data. The workflow management function controls development functional units for work support in the processes so that the multiple processes can be executed simultaneously in parallel. A change in one of the processes can be quickly made known to the other processes through the BOM list database.

The technique in Japanese Patent Application Publication No. 2003-281199 uses an electronic parts list system including a BOM list generating unit, a layout table generating unit, and a layout unit. The BOM list generating unit generates an electronic parts list according to input of a designer with reference to design reference data. The electronic parts list is a BOM list including parts information on parts to be used for designing an automobile. The layout table generating unit generates a layout list on the basis of parts information. The layout list is a table including requisite layout information required for parts layout. The layout unit generates layout information indicating a parts arrangement state, on the basis of the design reference information, the parts information, and the requisite layout information. The electronic parts list, the layout list, and the layout information are associated with each other.

Further, examples of a technique of checking validity of related information used for a technical BOM list, drawings, and a parts characteristic table include the technique in Japanese Patent Application Publication No. 2003-281203.

The technique in Japanese Patent Application Publication No. 2003-281203 uses a total inspection system including a part number rule database and an item check unit. The part number rule database stores rules for the parts numbers. Based on the first part numbers of first parts in an electronic parts list and the second part numbers of second parts in a parts characteristic table, which are assigned according to the rules, the item check unit detects a particular first part number as a first part number suitable for a concerned second part number, then detects a level of the particular first part having the particular first part number in the electronic parts list, and then checks whether the level matches a predetermined level of the second part. Note that in the electronic parts list, the first part number and first part information on each of the first parts are associated with each other, and each of the first parts is managed based on its level in a hierarchical structure. In the parts characteristic table, equipment units providing distinctive features to the specifications of a second part, and combinations of equipment units are associated with the second part numbers.

The aforementioned second parallel explosion method can execute high-speed processing for BOM trees having a small number of columns, i.e., a small number of end products even while having a large number of rows, i.e., a large number of components. However, sufficient execution performance may not be exerted for BOM trees having a large number of columns even while having only a small number of rows. This is because this method requires time to perform comparison and other processing for merging the numbers of units of each component in the BOM trees corresponding to the respective columns. In the case where the columns in the table resultant from the parallel explosion indicate end products, the table may include several hundred columns at least, and include even several thousand columns if there are a huge number of end products. In this case, even though reduction in the DB access time is achieved, it takes hours to complete the explosion itself.

It should be noted that none of the techniques described in the above prior art Patent Publications propose a method for solving problems in the processing for parallel explosions of BOM lists of multiple products in a way that the number of units of each of components constituting each of the multiple products is arranged in an area corresponding to the component.

In contrast, embodiments of the present invention enable high-speed processing for parallel explosions of BOM lists of multiple products in a way that the number of units of each of components constituting each of the multiple products is arranged in an area corresponding to the component, even when the number of the products is large. More particularly, one embodiment of the present invention provides an apparatus that performs parallel explosions of bill-of-materials lists of a plurality of products in a way that the number of units of each of components constituting each of the plurality of products is arranged in an area corresponding to the component, the apparatus comprising: a selection unit configured to select a particular component directly constituting a particular product among the plurality of products; a determination unit configured to determine whether or not the bill-of-materials list of the particular component selected by the selection unit is already broken down; an explosion unit configured to break down the bill-of-materials list of the particular component into parallel explosion information and bill-of-materials explosion information, when the determination unit determines that the bill-of-materials list of the particular component is not yet broken down, the parallel explosion information having the number of units of each of components constituting the particular component stored at a position corresponding to the particular product in an area corresponding to the component, the bill-of-materials explosion information including information specifying the number of units of each of the components and the area corresponding to each of the components in the parallel explosion information; and an adding unit configured to, when the determination unit determines that the bill-of-materials list of the particular component is already broken down, add the number of units of each of the components included in the bill-of-materials explosion information to the number of units stored in a position in the parallel explosion information, the position corresponding to the particular product in the area specified as corresponding to the component based on the information included in the bill-of-materials explosion information.

Here, as the area corresponding to each of the components constituting the particular component, the explosion unit may use, for a component the number of units of which is not stored in the parallel explosion information, an area determined in accordance with a predetermined rule, and for a component the number of units of which is stored in the parallel explosion information, an area in which the number of units of the component is stored.

In addition, the explosion units may break down the bill-of-materials list of the particular component into the parallel explosion information and the bill-of-materials explosion information, the parallel explosion information further having the number of units of the particular component stored at a position corresponding to the particular product in an area corresponding to the particular component, the bill-of-materials explosion information further including information specifying the number of units of the particular component and the area corresponding to the particular component in the parallel explosion information, and the adding unit may add the number of units of the particular component included in the bill-of-materials explosion information to the number of units stored in a position in the parallel explosion information, the position corresponding to the particular product in the area specified as corresponding to the particular component based on the information included in the bill-of-materials explosion information.

In this case, as the area corresponding to the particular component, the explosion unit may uses an area determined in accordance with a predetermined rule, when the number of units of the particular component is not stored in the parallel explosion information, and an area in which the number of units of the particular component is stored, when the number of units of the particular component is stored in the parallel explosion information.

Moreover, embodiments of the present invention provide an apparatus that performs parallel explosions of bill-of-materials lists of a plurality of products in a way that the number of units of each of components constituting each of the plurality of products is arranged in an area corresponding to the component, with one apparatus comprising: a selection unit configured to select a particular component directly constituting a particular product among the plurality of products; a determination unit configured to determine whether or not the bill-of-materials list of the particular component selected by the selection unit is already broken down; an explosion unit configured to break down the bill-of-materials list of the particular component into a parallel explosion list and a bill-of-materials explosion list when the determination unit determines that the bill-of-materials list of the particular component is not yet broken down, the parallel explosion list including a plurality of nodes respectively representing the components constituting the plurality of products, the parallel explosion list having the number of units of each of the components stored in a position corresponding to the particular product in an array corresponding to the node representing the component among the plurality of nodes, the bill-of-materials explosion list including a plurality of nodes respectively representing components constituting the particular component, the bill-of-materials explosion list having the number of units of each of the components and information specifying the node of the component in the parallel explosion list registered in the node representing the component among the plurality of nodes; and an adding unit configured to, when the determination unit determines that the bill-of-materials list of the particular component is already broken down, add the number of units of the component registered in each of the nodes included in the bill-of-materials explosion list to the number of units stored in a position corresponding to the particular product in an array corresponding to the node in the parallel explosion list, the node specified as representing the component based on the information registered in each of the nodes included in the bill-of-materials explosion list.

Embodiments of an apparatus may further comprise: a database configured to store the bill-of-materials lists of the plurality of products; and a memory configured to store an adjacency list generated based on the bill-of-materials lists of the plurality of products, the adjacency list having a plurality of nodes respectively representing the plurality of products and the components constituting the plurality of products, wherein among the plurality of nodes included in the adjacency list, the selection unit selects as the particular component a component represented by a node specified based on information which is registered in the bill-of-materials list and is held by the node representing the particular product.

Moreover, embodiments of the present invention also provide a method for parallel explosions of bill-of-materials lists of a plurality of products in a way that the number of units of each of components constituting each of the plurality of products is arranged in an area corresponding to the component, with one method comprising the steps of: selecting a particular component directly constituting a particular product among the plurality of products; determining whether or not the bill-of-materials list of the selected particular component is already broken down; breaking down the bill-of-materials list of the particular component into parallel explosion information and bill-of-materials explosion information, when it is determined that the bill-of-materials list of the particular component is not yet broken down, the parallel explosion information having the number of units of each of components constituting the particular component stored at a position corresponding to the particular product in an area corresponding to the component, the bill-of-materials explosion information including information specifying the number of units of each of the components and the area corresponding to of each of the components in the parallel explosion information; and when it is determined that the bill-of-materials list of the particular component is already broken down, adding the number of units of each of the components included in the bill-of-materials explosion information to the number of units stored at a position in the parallel explosion information, the position corresponding to the particular product in the area specified as corresponding to the component based on the information included in the bill-of-materials explosion information.

Furthermore, embodiments of the present invention also provide a program causing a computer to function as an apparatus that performs parallel explosions of bill-of-materials lists of a plurality of products in a way that the number of units of each of components constituting each of the plurality of products is arranged in an area corresponding to the component, the program causing the computer to function as: a selection unit configured to select a particular component directly constituting a particular product among the plurality of products; a determination unit configured to determine whether or not the bill-of-materials list of the particular component selected by the selection unit is already broken down; an explosion unit configured to break down the bill-of-materials list of the particular component into parallel explosion information and bill-of-materials explosion information, when the determination unit determines that the bill-of-materials list of the particular component is not yet broken down, the parallel explosion information having the number of units of each of components constituting the particular component stored at a position corresponding to the particular product in an area corresponding to the component, the bill-of-materials explosion information including information specifying the number of units of each of the components and the area corresponding to each of the components in the parallel explosion information; and an adding unit configured to, when the determination unit determines that the bill-of-materials list of the particular component is already broken down, add the number of units of each of the components included in the bill-of-materials explosion information to the number of units stored at a position in the parallel explosion information, the position corresponding to the particular product in the area specified as corresponding to the component based on the information included in the bill-of-materials explosion information.

A description is given below in detail of one embodiment of the present invention with reference to the accompanying drawings.

Design Method as Base of Embodiment

In one embodiment, one of BOM trees stored in a database is broken down in a graph structure built up as an adjacency list structure in a memory, and an explosion result is represented by a linked list and a component-units-number array storing the numbers of units of each component (hereinafter referred to as the numbers of component units) corresponding to respective nodes in the linked list. Another one of the BOM trees to be subjected to parallel explosions is also broken down in the graph structure likewise, and this linked list is searched to find a node of a component to be merged. If a node to be merged is found, the number of component units is written in a component-units-number array of the found node. If no node to be merged is found, a new node is inserted into the linked list. This operation is repeated for all the BOM trees under an end product for parallel explosions.

Speeding up of the parallel explosions in this embodiment is based on a design panning employing a general-purpose data structure based on a graph theory. Since all of the accesses to the database are made at the beginning, I/O can be minimized. In addition, since an explosion result is represented by the linked list instead of the array, data can be efficiently inserted and deleted. Further, since there are BOM trees in the graph structure in the memory, any one of a depth-priority explosion (an explosion based on searching with priority given to a depth) and a width-priority explosion (an explosion based on searching with priority given to a width) can be repeatedly executed any number of times as appropriate. Besides, the explosion only requires tracing a pointer in the memory, and thus is extremely efficient.

Figure 1B:
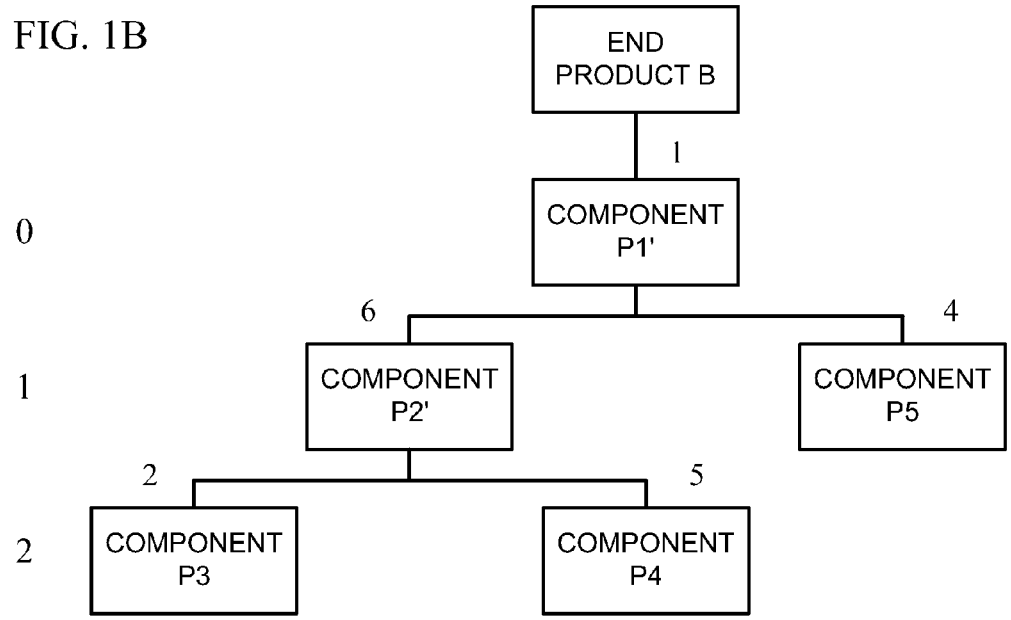

FIGS. 1A and 1B show examples of BOM trees for the parallel explosions in this embodiment.

FIG. 1A shows a BOM tree of an end product A, and FIG. 1B shows a BOM tree of an end product B. Note that reference numeral suffixed to each component is a part number of the component in FIGS. 1A and 1B. Numbers in bold-face type on the left side of each of the BOM trees show the levels of the explosions. Explosion levels of components (assemblies) P1 and P1' at one level lower than end products are herein 0. Numbers added to lines linking components represent the numbers of units of each component. Although it is actually impossible that an end product is constituted of only one assembly, a simplified example is herein shown for convenience.

Figure 2:
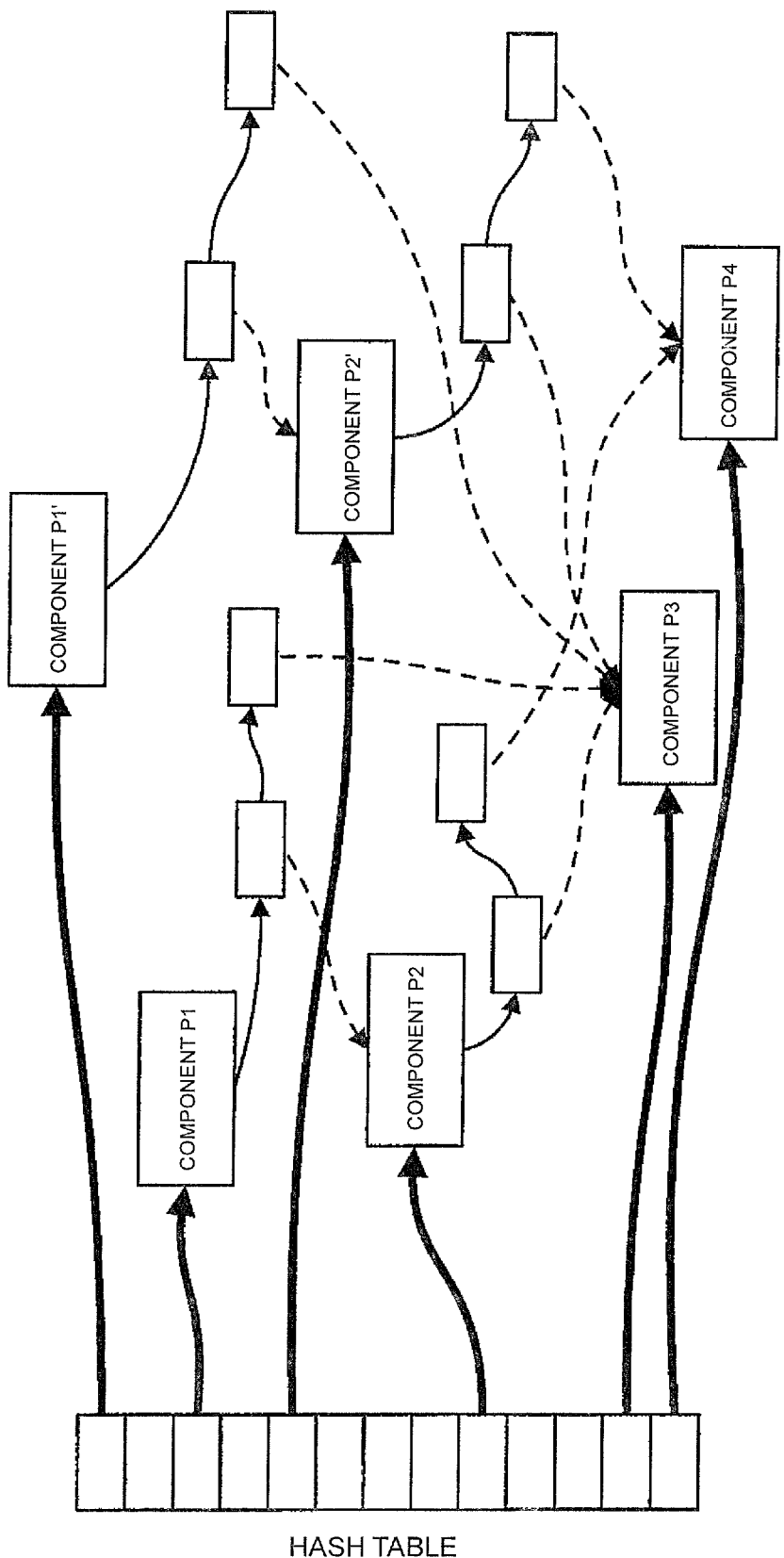
FIG. 2 is a diagram showing an example of an adjacency list structure generated from the BOM trees.

FIG. 2 shows an example of an adjacency list structure of the BOM trees in FIGS. 1A and 1B.

For example, FIG. 2 shows a state in which structural data corresponding to the BOM trees in FIGS. 1A and 1B is read from a database by using a recursive SQL or the like and is broken down into the adjacency list structure in the memory. Note that components whose explosion levels are 0 or lower in each of the BOM trees are herein broken down.

Arrows represent pointers, and what is required for high speed recursive execution of the parallel explosions of the BOM trees is only to trace the pointers.

FIGS. 3A and 3B show modes of showing results of the parallel explosions of the BOM trees in FIGS. 1A and 1B.

FIG. 3A shows that the explosion result of the BOM trees is shown in a format in which each part number is indented according to the explosion level thereof.

FIG. 3B shows calculated numbers of component units in a matrix form in addition to the display in FIG. 3A. A certain end product in its tree only includes components having the number of component units of 0 in a corresponding column in this matrix. A parent component directly above a certain component in a BOM tree of a certain end product is found by upwardly tracing a column corresponding to the end product from the certain component. In the tracing, the parent component is a first one of components having one explosion level higher than the certain component and not having the number of component units of 0.

Parallel Explosion Data Structure and its Creation Logic

In each of modes in FIGS. 3A and 3B, original data can be represented in the original data structure.

FIG. 4 shows a data structure (an explosion result list) corresponding to the BOM tree in FIG. 1A.

Firstly, the BOM tree is broken down by a depth-priority search, and an explosion result is held in a linked list. At the same time, a dynamic array is created to include each node included in the linked list, the array having a size of the number of columns of a matrix. Then, the numbers of corresponding component units are stored in the first column of the dynamic array. This is a component-units-number array.

Thereafter, by using this explosion result list as a key list, the BOM tree in FIG. 1B is broken down by the depth-priority search, and an explosion result is applied to the key list. At this time, the following merging rule is applied.

Specifically, if the same component as a currently broken down component exists in the same level as that of the component, a calculation result of the number of component units is written at a position corresponding to the component in the second column of the component-units-number array. On the other hand, if the same component as the currently broken down component does not exist in the same level as that of the component, the current component is added to the last row of the explosion level. However, the merging rule is an example of specific work requirements, and a merging method and a position for adding a component can change variously, depending on the work. However, the logic of this part is independent from the data structure, and thus a later revision can be made easily.

The basic concept of the merging is as follows. A component of a BOM tree to be broken down is searched at the level of the component. If there is no match in the key list, a row is added. If there is a match in the key list, the number of component units of the component currently broken down is written in a matched row of the key list which is the component-units-number array.

Figure 5:
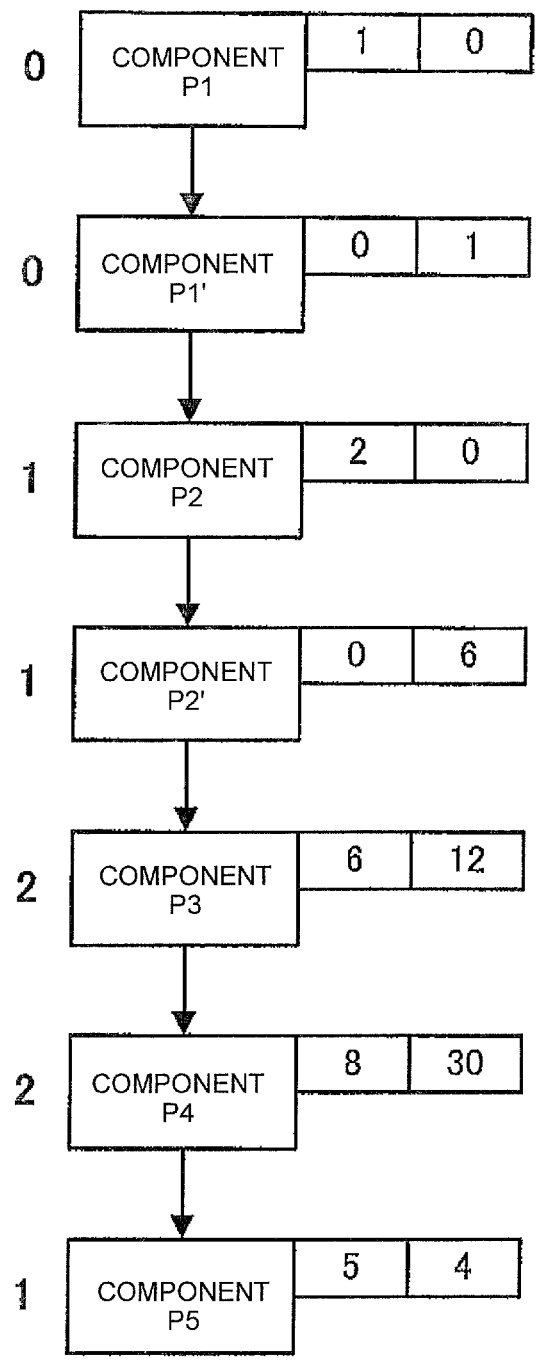
FIG. 5 is a diagram showing examples in an explosion result list generated from the BOM trees.

FIG. 5 shows a merging result based on this logic.

In other words, FIG. 5 shows the result of merging explosion results of the BOM tree in FIG. 1B by applying the logic to the key list in FIG. 4.

After this merging, a linked list showing the explosion result and values in the component-units-number array for the nodes can be outputted in any one of the formats in FIGS. 3A and 3B.

Meanwhile, this example uses two BOM trees, i.e., two columns in an explosion result table. However, there is a case where an explosion result table has hundreds or thousands of columns. This case requires a larger number of repetition times of comparative processing for components for the merging even though the explosion of the BOM tree itself can be executed at a high speed by performing tracing by use of the pointer, thus requiring a longer processing time.

Specific Implementation Method in One Embodiment

As described above, even though there are many end products due to reflection of various options, assemblies at one level lower than the end products are made common, and thus the types thereof are limited. In the aforementioned example, if the end products A and B include identical assembles, the BOM trees thereof having the vertexes of the assemblies are also identical. This means that a result of the explosion of the end product A, that is, the numbers of component units corresponding to parts numbers of the broken down components have only to be copied to the column of the end product B in the corresponding order. Specifically, a column of a broken down assembly is recorded. If an assembly traced later from a different end product is found to have the same column of the broken down assembly, the numbers of component units have only to be copied to the column of the current end product.

First Implementation Example

Figure 6A:
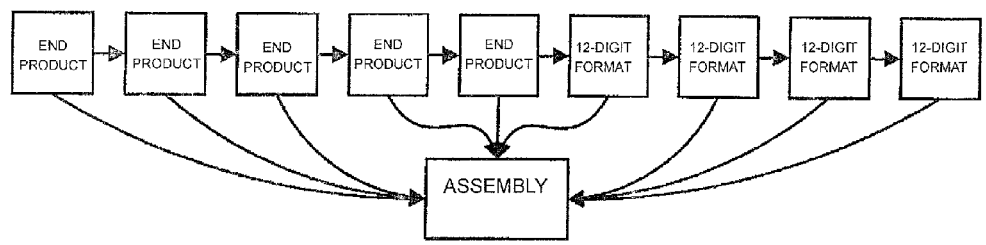
FIGS. 6A and 6B are diagrams for explaining a first implementation example.
Figure 6B:
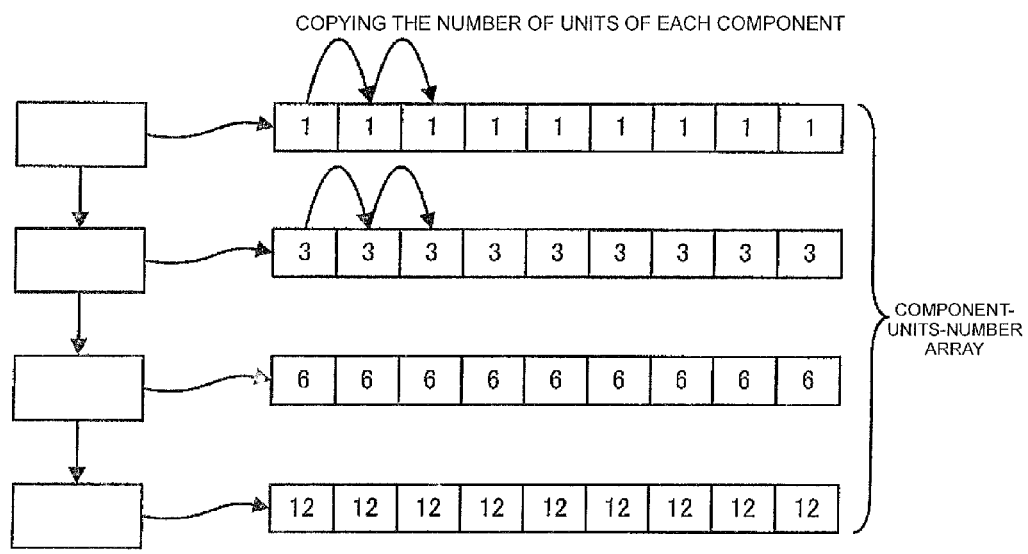

FIGS. 6A and 6B show a first implementation example in this embodiment.

Suppose a case as an extreme case where all of the end products use the same assemblies as components as shown in FIG. 6A. In this case, a column of every end product has the identical explosion result, and the same components are all merged. Thus, breaking down the BOM tree for each column is waste of time.

Hence, it is conceivable that the numbers of component units of the first explosion result should be copied to columns of the component-units-number array.

However, this method causes a problem. This is because there is no such case where different end products are all constituted of the same assembles only. In other words, a difference among the end products is attributable to a difference among assembles. Because of the difference, simply copying the numbers of component units of an explosion result is not sufficient. A column of an explosion result includes all of components in a BOM tree which are under an assembly under an end product of the column. Accordingly, when being constituted of multiple assembles, the end product does not naturally have an explosion result of a single assembly.

Second Implementation Example

Hence, a second implementation example is proposed in this embodiment.

Figure 7A:
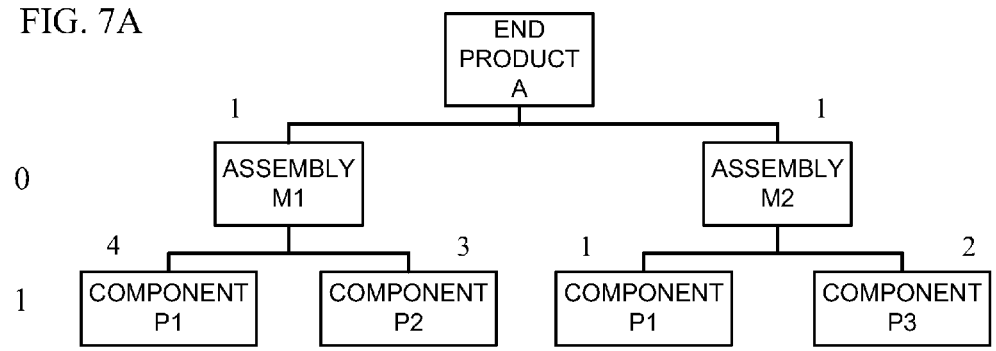
FIGS. 7A, 7B and 7C are diagrams showing BOM trees used for explaining a second implementation example.
Figure 7B:
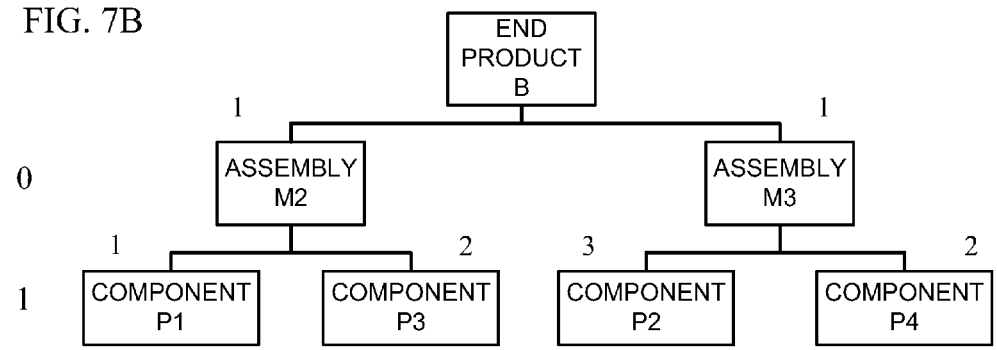
Figure 7C:
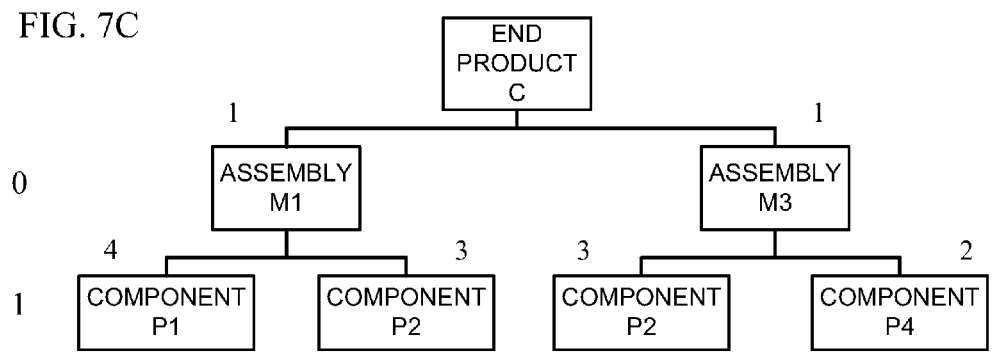

FIGS. 7A, 7B, and 7C show examples of BOM trees for explaining the second implementation example.

FIG. 7A shows a BOM tree of an end product A, FIG. 7B shows a BOM tree of an end product B, and FIG. 7C shows a BOM tree of an end product C. In this example, the end products A and C use a common assembly M1, the end products A and B use a common assembly M2, and the end products B and C use a common assembly M3.

Figure 8:
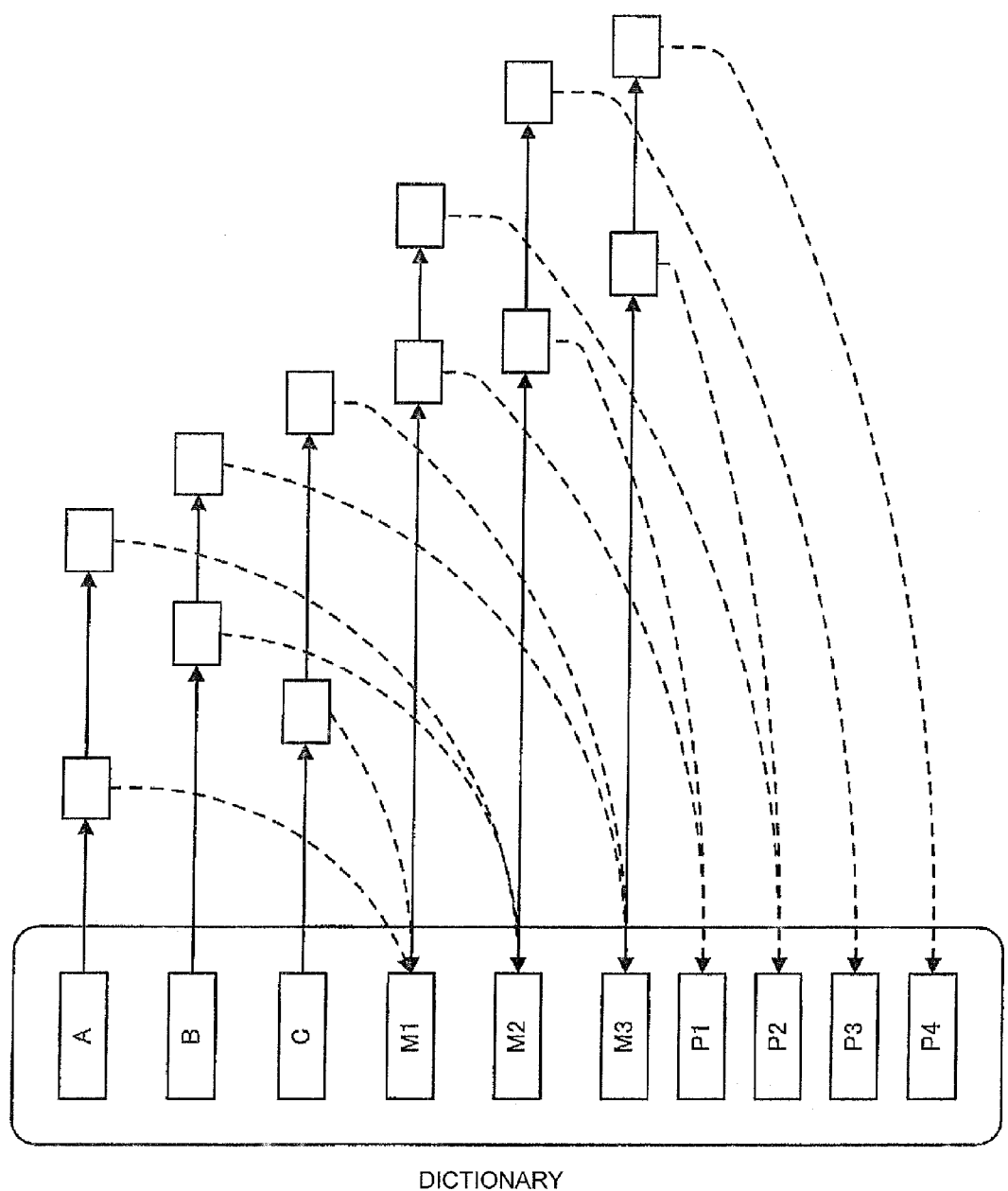
FIG. 8 is a diagram showing an example of an adjacency list structure generated from the BOM trees used for explaining the second implementation example.

FIG. 8 shows an example of an adjacency list structure for the BOM trees in FIGS. 7A to 7C.

Specifically, FIG. 8 shows data of the BOM trees in FIGS. 7A to 7C for parallel explosions in an adjacency list structure in the memory after the data thereof are all read from a database.

A dictionary has component data registered therein without duplication, the component data corresponding to components in the BOM trees.

Each component in the dictionary has a list of a component (a component list) whose level is one level lower than the component in the dictionary.

Further, a node of each component in the component list has information on a position associated with the component data corresponding to the component.

The use of such an adjacency list structure makes it possible to achieve explosions of the BOM trees while tracing the component list from component data at a vertex through a node of a component in the component list to component data corresponding to the component.

Suppose that the numbers of component units in a column of the explosion result are simply copied to another column.

FIGS. 9A to 9E show tables of the explosion results. However, the BOM trees in only FIGS. 7A and 7B are shown.

Firstly, as shown in FIG. 9A, the assembly M1 of the end product A is broken down. Since the end product B does not have the assembly M1 thereunder, the number of component units of 0 is stored in the column of the end product B as shown in FIG. 9B.

Next, as shown in FIG. 9C, the assembly M2 of the end product A is broken down. The end product B has the assembly M2 thereunder. Since the assembly M2 is already broken down in the column of the end product A, the numbers of component units stored in the column of the end product A are copied to the column of the end product B as shown FIG. 9D.

In addition, the end product B has the assembly M3 thereunder, and thus the assembly M3 is broken down as shown FIG. 9E.

However, simply copying the numbers of component units in such a manner leads to an incorrect result. When the numbers of component units are copied simply, the number of component units of the assembly M1 in the column of the end product A is also copied. For this reason, the number of component units in the column of the end product B has a larger number than an actual one.

FIG. 10 shows a table having a correct explosion result.

The final explosion result must be like this.

The reason why the numbers of component units are not correct in FIG. 9 is that simply copying the numbers of component units in the column of the explosion result does not allow differences among the explosion results of the multiple assemblies to be distinguished.

Hence, in the second implementation example, an explosion result of a BOM tree of each assembly is held individually as a tree-specific list, and each of nodes in the tree-specific list is designed to point to a corresponding row in the explosion result list. In addition, since an explosion result of the BOM tree of components under the assembly is required, information which is a copy source is held for each BOM tree under the assembly.

Figure 11:
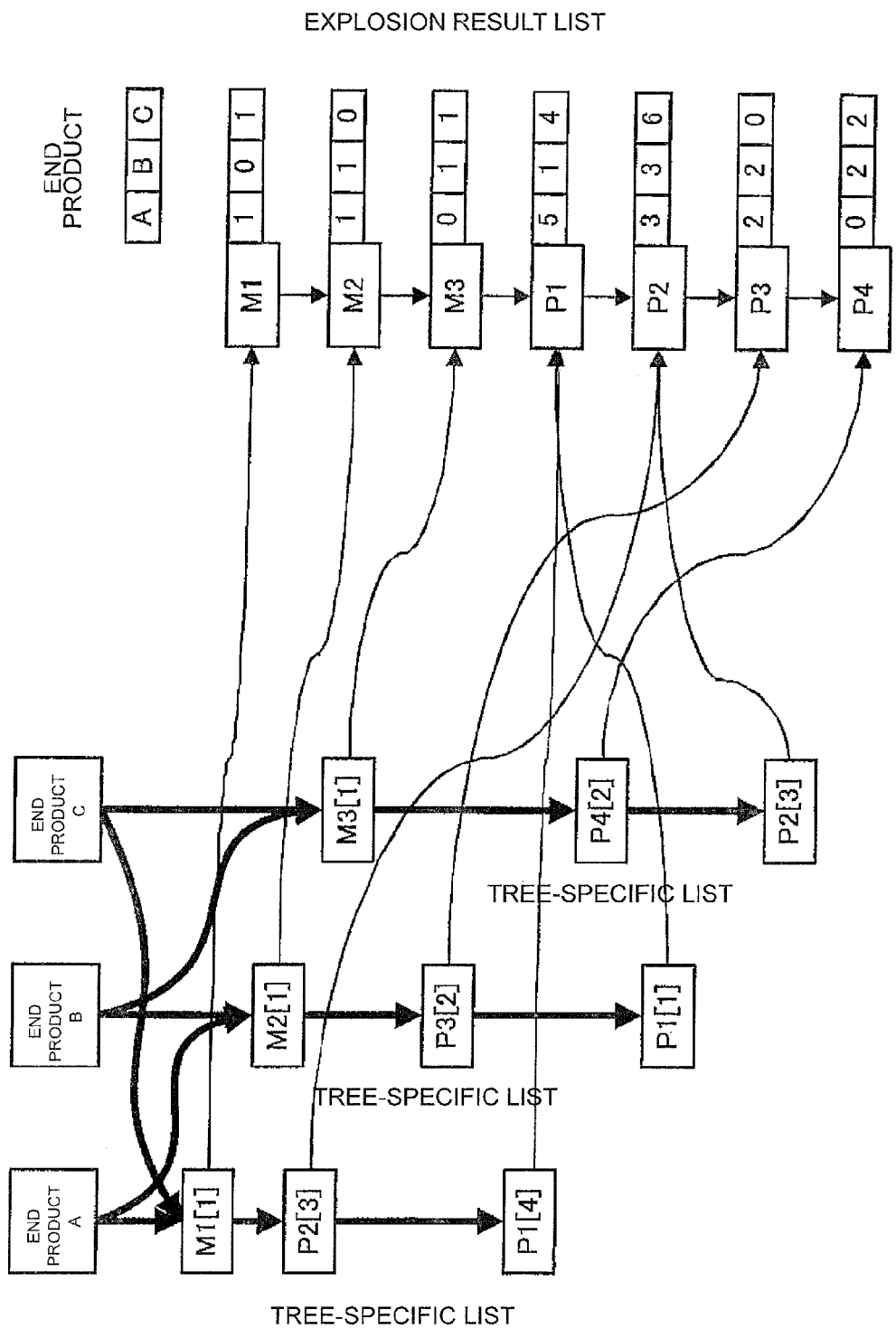
FIG. 11 is a diagram showing an example of a parallel explosion data structure in a case of width-priority explosions in the second implementation example.

FIG. 11 shows a parallel explosion data structure in a case of width-priority explosions in the second implementation example. In the width-priority explosions, the BOM tree of the end product A is broken down in the order from M1, M2, P1, P2, P1, and P3; the BOM tree of the end product B, from M2, M3, P1, P3, P2, and P4; and the BOM tree of the end product C, from M1, M3, P1, P2, P2, and P4.

Meanwhile, in the parallel explosion data structure, each assembly has a tree-specific list thereunder which stores the numbers of component units resultant from calculations after only BOM trees under the assembly are broken down. Values in square brackets in the tree-specific list represent the calculated numbers of component units. Note that the tree-specific list is different from the explosion result list finally resultant from merging of multiple BOM trees. The tree-specific list is created only once when the BOM tree having the assembly as a vertex is broken down for the first time. Since a correspondence between each component in the tree-specific list and a component in the explosion result list can be known at this timing, a position of the component is stored so that labor of searching later can be saved. Thus, there is no need to concern about the order of explosions in the tree-specific list.

Thereafter, when the BOM tree having the assembly as the vertex appears again, the explosion result in the tree-specific list belonging to the assembly and the position of each component in the explosion result list are extracted, then the explosion result is merged (copied) to the explosion result list at the position.

For example, suppose a case where the BOM trees are broken down in the order from the end products A, B, and C. A tree-specific list of the assembly M2 is created for the first time when the BOM tree of the end product A is broken down. Thereafter, when the assembly M2 appears while the BOM tree of the end product B is broken down, the tree-specific list of the assembly M2 already exists. Hence, tracing is performed from each of components in the tree-specific list to find a corresponding component in the explosion result list, and the number of units of the corresponding component held by the tree-specific list is added to a value of an element in a column of the end product B in the component-units-number array, the element corresponding to the component in the explosion result list.

Now, a description is roughly given of an explosion operation for a BOM tree in this case.

First, suppose a case of processing the assembly M1 at one level lower than the end product A. In this case, the number of units of the components P1 and P2 are recorded in the tree-specific list having the assembly M1 as the vertex. In addition, nodes of the assembly M1 and the components P1 and P2 are recorded in the explosion result list, and the numbers of component units of the assembly M1 and the components P1 and P2 are respectively added to the numbers of component units in component-units-number arrays for the nodes in the column of the end product A. Thereafter, positions at which the assembly M1 and the components P1 and P2 are registered in the explosion result list are recorded in the tree-specific list having the assembly M1 as the vertex.

Next, suppose a case of processing the assembly M2 at one level lower than the end product A. In this case, the numbers of component units of the components P1 and P3 are recorded in the tree-specific list having the assembly M2 as the vertex. In addition, a node of the component P1 is found in the explosion result list, nodes of the assembly M2 and the component P3 are registered, and the numbers of component units thereof are respectively added to values in the column of the end product A in component-units-number arrays for the nodes. Subsequently, positions at which the assembly M2 and the components P1 and P3 are registered in the explosion result list are recorded in the tree-specific list having the assembly M2 as the vertex.

Next, suppose a case of processing the assembly M2 at one level lower than the end product B. In this case, where to copy the numbers of component units of the assembly M2 and the components P1 and P3 recorded in the tree-specific list having the assembly M2 as the vertex are determined according to the registration positions recorded in the tree-specific list, and the numbers of component units are added to values in the column of the end product B in the component-units-number arrays for the nodes of the assembly M2 and the components P1 and P3 in the explosion result list.

Next, suppose a case of processing the assembly M3 at one level lower than the end product B. In this case, the numbers of component units of the components P2 and P4 are firstly recorded in the tree-specific list having the assembly M3 as the vertex. In addition, a node of the component P2 is found in the explosion result list, nodes of the assembly M3 and the component P4 are registered, and the numbers of component units thereof are respectively added to values in the column of the end product B in component-units-number arrays for the nodes. Subsequently, positions at which the assembly M3 and the components P2 and P4 are registered in the explosion result list are recorded in the tree-specific list having the assembly M3 as the vertex.

Next, suppose a case of processing the assembly M1 at one level lower than the end product C. In this case, where to copy the numbers of component units of the assembly M1 and the components P1 and P2 recorded in the tree-specific list having the assembly M1 as the vertex are determined according to the registration positions recorded in the tree-specific list, and the numbers of component units thereof are added to values in the column of the end product C in the component-units-number arrays for the nodes of the assembly M1 and the components P1 and P2 in the explosion result list.

Lastly, suppose a case of processing the assembly M3 at one level lower than the end product C. In this case, where to copy the numbers of component units of the assembly M3 and the components P2 and P4 recorded in the tree-specific list having the assembly M3 as the vertex are determined according to the registration positions recorded in the tree-specific list, and the numbers of component units thereof are added to values in the column of the end product C in the component-units-number arrays for the nodes of the assembly M3 and the components P2 and P4 in the explosion result list.

Figure 12:
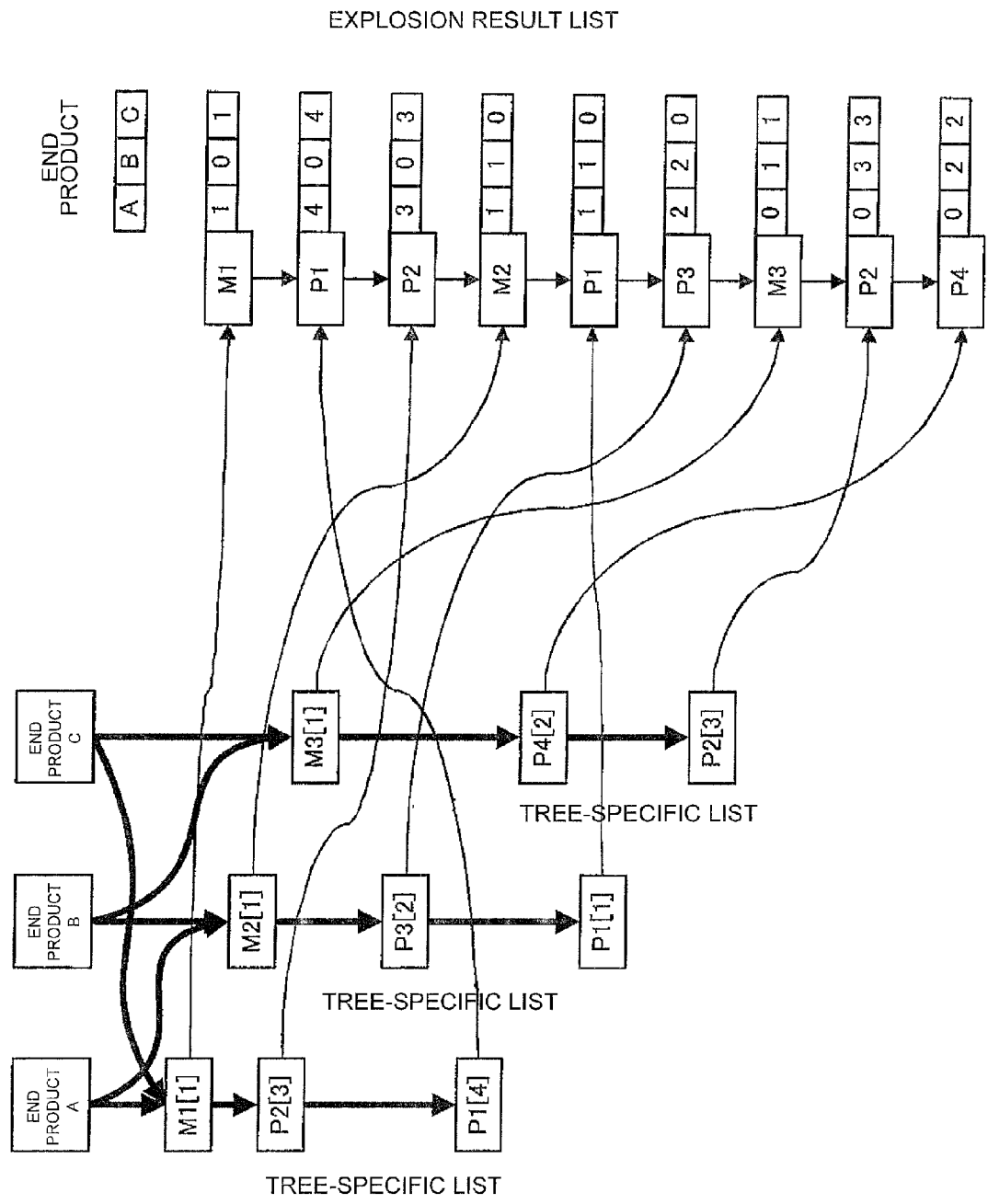
FIG. 12 is a diagram showing an example of a parallel explosion data structure in a case of depth-priority explosions in the second implementation example.

FIG. 12 shows a parallel explosion data structure in a case of depth-priority explosions in the second implementation example. In the depth-priority explosions, the BOM tree of the end product A is broken down in the order from M1, P1, P2, M2, P1, and P3; the BOM tree of the end product B, from M2, P1, P3, M3, P2, and P4; the BOM tree of the end product C, from M1, P1, P2, M3, P2, and P4.

The data structure and an explosion operation in the depth-priority explosions are the same as those in the width-priority explosions except that components in the explosion result list are arranged in an order according to the depth-priority explosions. Thus, a description thereof is herein omitted.

As described above in the second implementation example, positions of components in the explosion result list are stored in the respective components in tree-specific lists. Thereby, unnecessary comparative processing for the merging can be avoided, and thus the performance of the parallel explosion is drastically improved.

Parallel Explosion Apparatus Achieving Implementation Method in this Embodiment.

Next, a description is given of a parallel explosion apparatus achieving the second implementation example proposed in this embodiment.

Functional Configuration of Parallel Explosion Apparatus.

Figure 13:
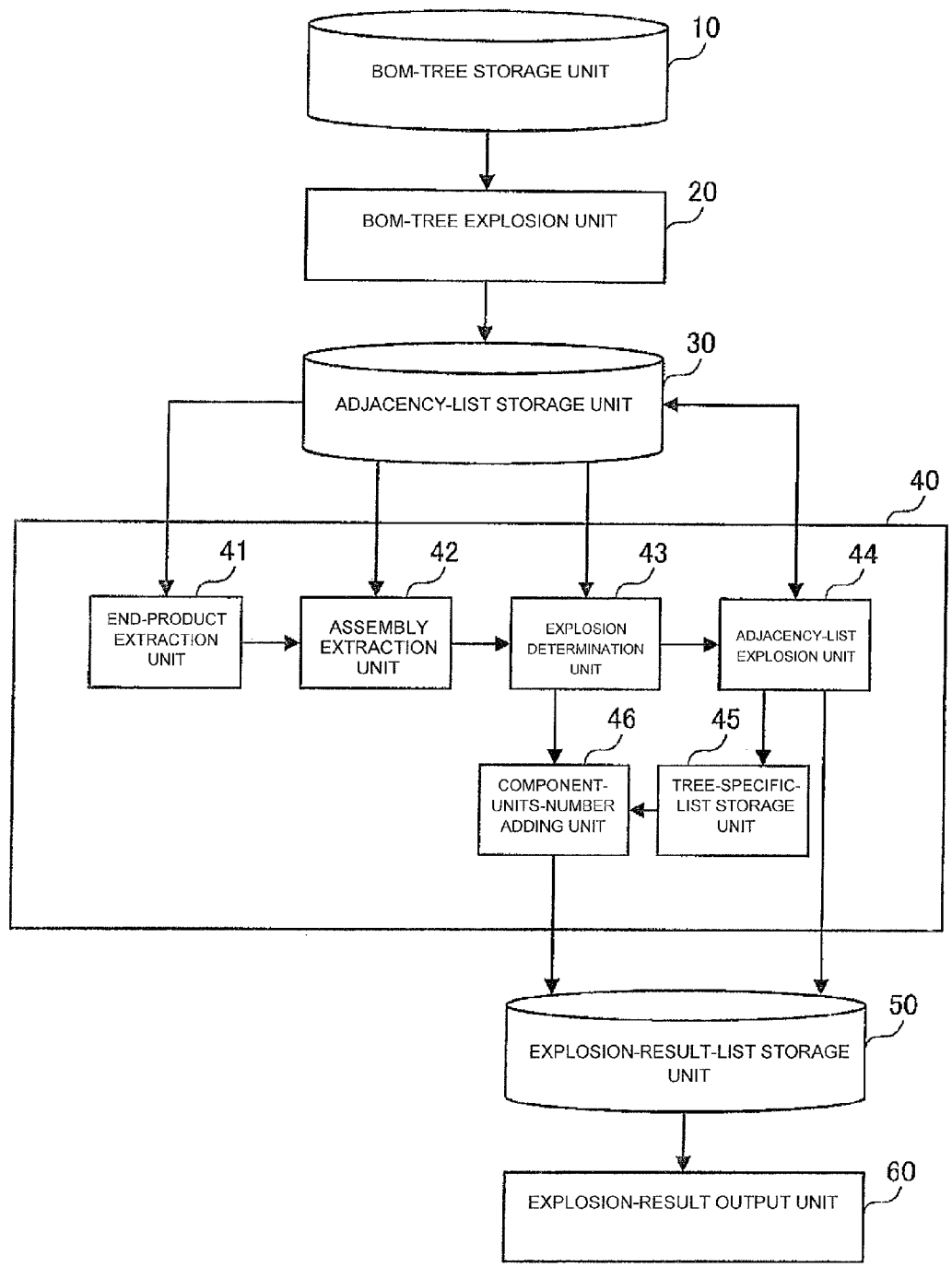
FIG. 13 is a block diagram showing a functional configuration example of a parallel explosion apparatus in an embodiment of the present invention.

FIG. 13 shows a functional configuration example of such a parallel explosion apparatus.

As illustrated therein, the parallel explosion apparatus includes a BOM-tree storage unit 10, a BOM-tree explosion unit 20, an adjacency-list storage unit 30, a parallel explosion unit 40, an explosion-result-list storage unit 50, and an explosion-result output unit 60.

Figure 15:
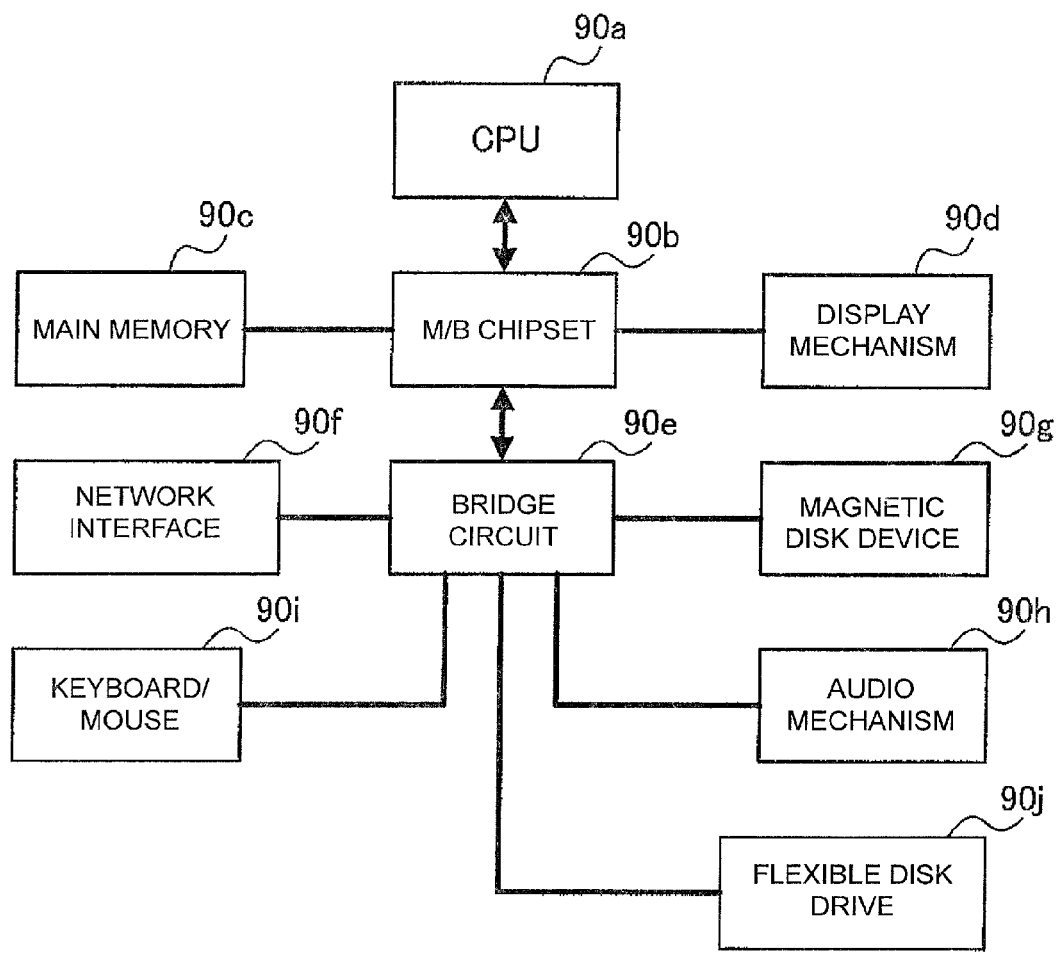
FIG. 15 is a diagram showing a hardware configuration of a computer to which the embodiment of the present invention is applicable.

The BOM-tree storage unit 10 is a database storing BOM trees of multiple products, and is implemented by a magnetic disk device 90g, for example (see FIG. 15).

The BOM-tree explosion unit 20 breaks down the BOM trees of the multiple products stored in the BOM-tree storage unit 10 into an adjacency list structure. The BOM-tree explosion unit 20 is implemented in a way that, for example, a CPU 90a (see FIG. 15) loads a program stored in the magnetic disk device 90g (see FIG. 15) onto a main memory 90c (see FIG. 15) and then executes the program.

The adjacency-list storage unit 30 stores data of the adjacency list structure generated by the BOM-tree explosion unit 20 by breaking down the BOM trees. The adjacency-list storage unit 30 is implemented by the main memory 90c, for example (see FIG. 15). In this embodiment, the adjacency-list storage unit 30 is provided as an example of a memory storing an adjacency list.

The parallel explosion unit 40 performs parallel explosions on the BOM trees of the multiple products while tracing a pointer of each data in the adjacency list structure stored in the adjacency-list storage unit 30, and then generates an explosion result list. The parallel explosion unit 40 is implemented in a way that, for example, the CPU 90a (see FIG. 15) loads a program stored in the magnetic disk device 90g (see FIG. 15) onto the main memory 90c (see FIG. 15) and then executes the program.

The explosion-result-list storage unit 50 stores therein the explosion result list generated by the parallel explosion unit 40. The explosion result list includes a linked list and component-units-number arrays as described above. The linked list links each node representing a corresponding one of components constituting each of multiple products to be broken down in parallel. Each of the component-units-number arrays is provided for the component represented by the node and stores the number of units of each component in the product. The adjacency-list storage unit 30 is implemented by the main memory 90c, for example (see FIG. 15). In this embodiment, the explosion result list is used as an example of parallel explosion information and a parallel explosion list.

The explosion-result output unit 60 outputs information held in the explosion result list stored in the explosion-result-list storage unit 50 to a display mechanism 90d, for example (see FIG. 15). The explosion-result output unit 60 is implemented in a way that, for example, the CPU 90a (see FIG. 15) loads a program stored in the magnetic disk device 90g (see FIG. 15) onto the main memory 90c (see FIG. 15) and then executes the program.

Here, the parallel explosion unit 40 is described in more detail.

As illustrated in FIG. 13, the parallel explosion unit 40 includes an end-product extraction unit 41, an assembly extraction unit 42, an explosion determination unit 43, an adjacency-list explosion unit 44, a tree-specific-list storage unit 45, and a component-units-number adding unit 46.

The end-product extraction unit 41 extracts an end product from data in the adjacency list structure stored in the adjacency-list storage unit 30. In this embodiment, the end product is used as an example of a product.

From the data in the adjacency list structure stored in the adjacency-list storage unit 30, the assembly extraction unit 42 extracts an assembly directly constituting the end product extracted by the end-product extraction unit 41. Specifically, the assembly extraction unit 42 extracts the assembly by performing tracing by use of a pointer from data of the end product in the data in the adjacency list structure. In this embodiment, the assembly is used as an example of a particular component directly constituting a particular product, and the assembly extraction unit 42 is provided as an example of a selection unit configured to select the particular component.

The explosion determination unit 43 determines whether or not a BOM tree having a vertex of the assembly extracted by the assembly extraction unit 42 is already broken down. In this embodiment, the explosion determination unit 43 is provided as an example of a determination unit configured to determine whether or not a BOM list of a particular component is already broken down.

When the explosion determination unit 43 determines that the BOM tree having the vertex of the assembly extracted by the assembly extraction unit 42 is not yet broken down, the adjacency-list explosion unit 44 breaks down the BOM tree having the vertex of the assembly by referring to the data in the adjacency list structure stored in the adjacency-list storage unit 30. Specifically, the adjacency-list explosion unit 44 breaks down the BOM tree by performing tracing by use of a pointer from data of the assembly in the data in the adjacency list structure, and thereby generates a tree-specific list and an explosion result list. In this embodiment, the adjacency-list explosion unit 44 is provided as an example of an explosion unit configured to break down a BOM list of a particular component when the BOM list of the particular component is determined to be not yet broken down.

The tree-specific-list storage unit 45 stores the tree-specific list generated by the adjacency-list explosion unit 44 by breaking down the BOM tree. Note that the tree-specific list is a linked list in which a node representing the assembly is linked to each node representing a corresponding component in the BOM tree having the assembly as the vertex, as described above. Each node has the number of component units and information registered therein, the number of component units being of the component represented by the node, the information indicating a row of the component represented by the node in the explosion result list. In this embodiment, the tree-specific list is used as an example of BOM list explosion information and a BOM list explosion list.

When the explosion determination unit 43 determines that the BOM tree having the vertex of the assembly extracted by the assembly extraction unit 42 is already broken down, the component-units-number adding unit 46 adds the number of component units registered in each node under the assembly in the tree-specific list stored in the tree-specific-list storage unit 45 to the number of component units stored in a component-units-number array in a row specified based on the information registered in the node and in a column of the end product. In this embodiment, the component-units-number adding unit 46 is provided as an example of an adding unit configured to, when the determination unit determines that a BOM list of a particular component is already broken down, add the number of component units included in BOM explosion information to the number of component units in parallel explosion information.

Operation of Parallel Explosion Apparatus

In the parallel explosion apparatus, the BOM-tree explosion unit 20 firstly reads all the data for parallel explosions stored in the BOM list from the BOM-tree storage unit 10 to break down the data into an adjacency list structure, and stores data in the adjacency list structure in the adjacency-list storage unit 30. Next, the order of breaking down end products to be broken down is determined so that assemblies at one level lower than the end products can be extracted in turn. This can be achieved by providing data of the end product in the data of the adjacency list structure with data indicating the explosion order.

On the assumption that such processing is already performed, the parallel explosion unit 40 starts an operation.

Figure 14:
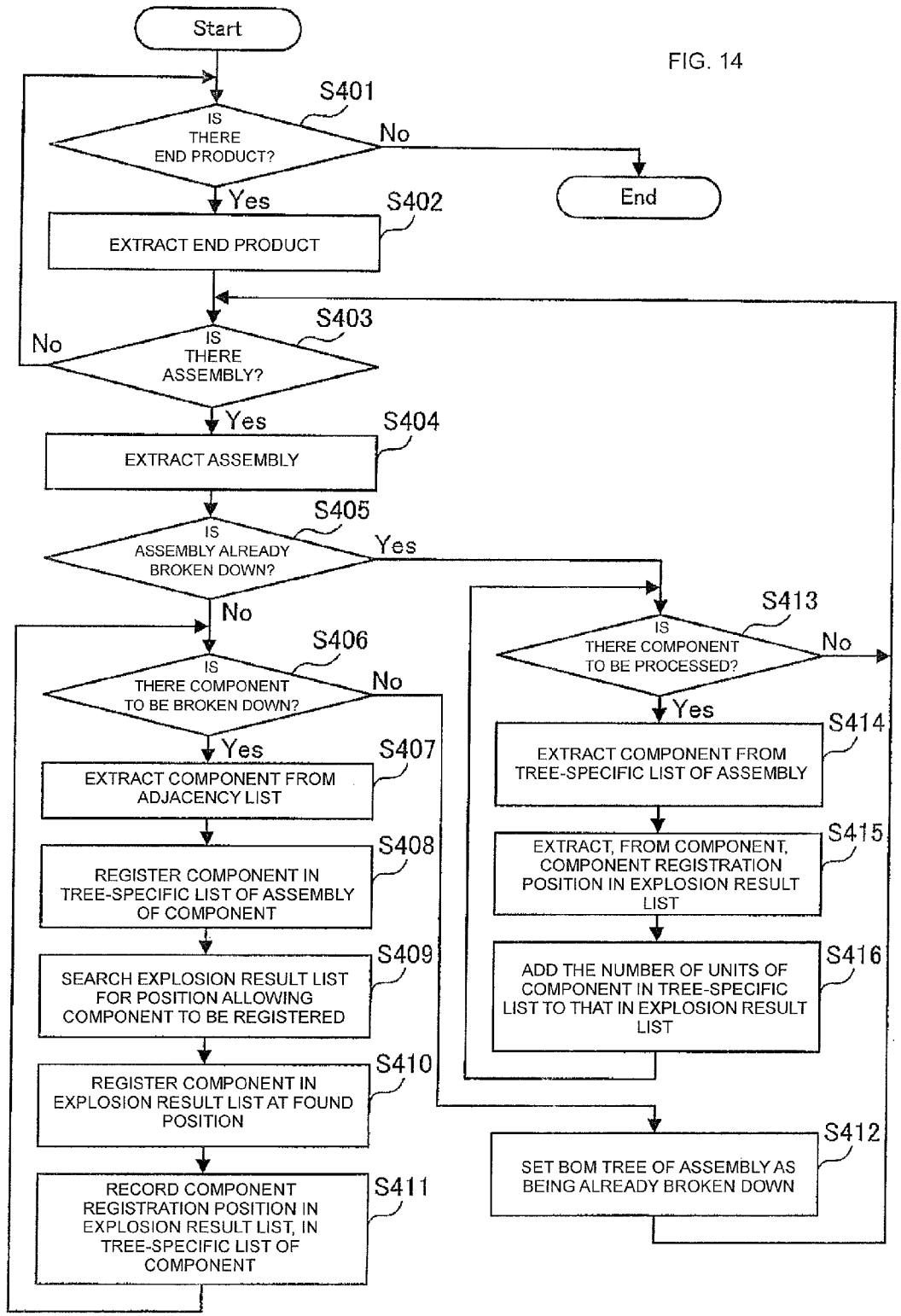
FIG. 14 is a flowchart showing an operation example of a parallel explosion unit in the embodiment of the present invention.

FIG. 14 is a flowchart showing an operation example of the parallel explosion unit 40.

In the parallel explosion unit 40, the end-product extraction unit 41 firstly determines whether or not there is left an end product to be broken down (Step 401). When the parallel explosion unit 40 determines that there is left an end product to be broken down, the end-product extraction unit 41 extracts the end product from the data in the adjacency list structure stored in the adjacency-list storage unit 30 (Step 402).

After the end-product extraction unit 41 extracts the end product, the assembly extraction unit 42 determines whether or not there is left an assembly at one level lower than the end product (Step 403). When determining there is left an assembly, the assembly extraction unit 42 extracts the assembly from the data in the adjacency list structure stored in the adjacency-list storage unit 30 (Step 404).

After the assembly extraction unit 42 extracts the assembly, the explosion determination unit 43 determines whether or not a BOM tree having a vertex of the extracted assembly is already broken down (Step 405). This can be achieved, for example, by providing data of the assembly in the adjacency list structure with a flag indicating whether or not the BOM tree having the assembly as the vertex is already broken down.

When the assembly extraction unit 42 determines that the BOM tree is not yet broken down as a result, the adjacency-list explosion unit 44 refers to data in the adjacency list structure stored in the adjacency-list storage unit 30 and thereby breaks down the BOM tree having the vertex of the assembly extracted in Step 404.

In other words, the adjacency-list explosion unit 44 firstly determines whether or not there is left a component to be broken down in the BOM tree (Step 406). When determining that there is left a component to be broken down in the BOM tree, the adjacency-list explosion unit 44 extracts the component from the data in the adjacency list structure stored in the adjacency-list storage unit 30 (Step 407). Note that in the examples in FIGS. 7A to 12, assemblies are also registered in the tree-specific list and the explosion result list, and thus an assembly is extracted at this timing. However, the operation may also be designed not to extract the assembly, but to extract only each component constituting the assembly. The order of extracting the components may be based on the width-priority search shown in FIG. 11 or the depth-priority search shown in FIG. 12.

Next, the adjacency-list explosion unit 44 registers the component extracted in Step 407 in the tree-specific list having the vertex of the assembly extracted in Step 404 (Step 408). Specifically, the adjacency-list explosion unit 44 sets a node representing the component in the tree-specific list and records the number of component units of the component in the node. Then, the tree-specific list is recorded in the tree-specific-list storage unit 45.

The adjacency-list explosion unit 44 also searches the explosion result list stored in the explosion-result-list storage unit 50 to find a position allowing merging or insertion of the component extracted in Step 407 into the explosion result list (Step 409). Specifically, when the component extracted in Step 407 is already registered in the explosion result list, the registered position is used as a position allowing the merging of the component. When the component extracted in Step 407 is not yet registered in the explosion result list, a position determined in accordance with a predetermined rule is used as the position allowing the insertion of the component. Then, the component is registered in the explosion result list at the position found as the result of the search (Step 410).

Subsequently, the adjacency-list explosion unit 44 records the registration position in a node representing the component in the tree-specific list stored in the tree-specific-list storage unit 45, the registration position being of the component in the explosion result list stored in the explosion-result-list storage unit 50 (Step 411). Then, the processing returns to Step 406.

In contrast, when determining in Step 406 that there is no component to be broken down in the BOM tree, the adjacency-list explosion unit 44 considers that the BOM tree having the vertex of the assembly extracted in Step 404 is already broken down (Step 412). This is performed by, for example, setting a flag of data of the assembly in data of the adjacency list structure to have information indicating that the BOM tree having the assembly as the vertex is already broken down. Then, the processing returns to Step 403 to be continued for another assembly.

Meanwhile, when it is determined in Step 405 that the BOM tree is already broken down, the component-units-number adding unit 46 refers to the tree-specific list stored in the tree-specific-list storage unit 45 and thereby adds the number of component units recorded in the tree-specific list having the vertex of the assembly extracted in Step 404 to the number of component units stored in the explosion result list stored in the explosion-result-list storage unit 50.

Specifically, the component-units-number adding unit 46 firstly determines whether or not there is left a component to be processed in the tree-specific list (Step 413). Then, when determining that there is left a component to be processed in the tree-specific list, the component-units-number adding unit 46 extracts the component from the tree-specific list (Step 414). Note that in the examples in FIGS. 7A to 12, the number of component units of assemblies are also stored in the explosion result list, and thus an assembly is extracted at this timing. However, the operation may also be designed to not extract the assembly but to extract only each component constituting the assembly.

Next, the component-units-number adding unit 46 extracts information from the extracted component, the information indicating a position at which the component is registered in the explosion result list (Step 415).

Thereafter, in a component-units-number array associated with the position of the explosion result list specified based on the extracted information, the component-units-number adding unit 46 adds the number of component units recorded in the extracted component to the number of component units stored in a column corresponding to the end product extracted in Step 402 (Step 416). Then, the processing returns to Step 413.

In contrast, when it is determined in Step 413 that there is no component to be processed in the tree-specific list, the processing returns to Step 403 to be continued for another assembly.

It should be noted that when it is determined in Step 403 that there is no assembly at one level lower than the end product, the processing returns to Step 401 to be continued for another end product.

When it is determined in Step 401 that there is no end product to be broken down, the processing is terminated.

When the explosion-result-list storage unit 50 stores therein the explosion result list generated by the parallel explosion unit 40 in this manner, the explosion result output unit 60 outputs the contents of the explosion result list to, for example, the display mechanism 90*d* (see FIG. 15).

Summary.

An explosion of the BOM list is generally performed for each vertex of BOM trees, and thus has conventionally been performed for each end product while using the end product as the vertex. For this reason, when an identical partial tree exists in the BOM tree, the same explosion has been repeated. Addition of merging processing of the same component for parallel explosions leads to the completely same result. However, comparative processing for the same merging is repeated, and the unnecessary repeated processing deteriorates the execution performance.

Generally, even though there are many variations in end products, there are not so many types in assemblies at one level lower than the end products. This is because common components are used. Hence, instead of breaking down BOM trees for each end product used as the vertex, each BOM tree is broken down from each assembly to hold an explosion result thereof. When multiple end products use the same assembly as a component, an explosion result which is already broken down and held is copied.

This enables explosion processing which have required hours in a case of many columns to be completed in minutes.

Computer Hardware Configuration of One Embodiment Application

FIG. 15 shows an example of a preferable hardware configuration of such a computer. As illustrated therein, a computer includes the central processing unit (CPU) 90*a* which is computing means, the main memory 90*c* connected to the CPU 90*a* through a motherboard (M/B) chipset 90*b*, and the display mechanism 90*d* likewise connected to the CPU 90*a* through the motherboard (M/B) chipset 90*b*. To the M/B chipset 90*b*, a network interface 90*f*, the magnetic disk device (HDD) 90*g*, an audio mechanism 90*h*, a keyboard/mouse 90*i*, and a flexible disk drive 90*j* are connected through a bridge circuit 90*e*.

The components in FIG. 15 are connected via a bus. For example, the CPU 90*a* and the M/B chipset 90*b*, and the M/B chipset 90*b* and the main memory 90*c* are connected each other via a CPU bus. In addition, the M/B chipset 90*b* and the display mechanism 90*d* may be connected to each other via an accelerated graphics port (AGP). However, when the display mechanism 90*d* includes a video card supporting PCI Express, the M/B chipset 90*b* and this video card are connected via a PCI Express (PCIe) bus. When the network interface 90*f* is connected to the bridge circuit 90*e*, PCI Express, for example, can be used. Serial AT attachment (ATA), parallel transfer ATA or peripheral components interconnect (PCI), for example, can be used for the magnetic disk device 90*g*. Further, universal serial bus (USB) can be used for the keyboard/mouse 90*i* and the flexible disk drive 90*j*.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described by using the above-described embodiments. However, the technical scope of the present invention is not limited to the embodiment. It is apparent to those skilled in the art that various changes can be made in the embodiment and alternative embodiments can be employed without departing from the spirit and scope of the present invention.

The present invention enables high-speed processing for parallel explosions of BOM lists of multiple products in a way that the number of units of each of components constituting each of the multiple products is arranged in an area corresponding to the component, even when the number of the products is large.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing explosions of bill-of-materials (BOM) lists of products, the method comprising:
a processing unit determining whether or not a BOM list of an assembly that is identified as an assembly within a selected product is already broken down into a first BOM graph structure for another product comprising an identified assembly node, and a plurality of component nodes each depending from the identified assembly node and representing different components of the identified assembly and comprising respective numbers of units of each of the plurality of components within the identified assembly;
in response to determining that the BOM list of the identified assembly is not broken down into the first BOM graph structure, the processing unit breaking down the BOM list of the identified assembly into a new BOM graph structure comprising a product node that represents the selected product and the identified assembly node depending from the product node and a plurality of component nodes each depending from the identified assembly node and representing different components of the identified assembly and comprising respective numbers of units of each of the plurality of components within the identified assembly, and storing respective numbers of units of each of the components nodes in a BOM matrix within different respective component row positions within a column of the BOM matrix for the selected product, wherein the BOM matrix comprises rows for the identified assembly and for each of the components, and columns for each of a plurality of products that include the specified selected product; and
in response to determining that the BOM list of the identified assembly is already broken down into the first BOM graph structure, the processing unit adding the numbers of units of each of the components nodes of the first BOM graph structure to numbers of units of respective corresponding ones of the components for the selected product that are stored in the different respective component BOM matrix row positions within the BOM matrix column for the selected product, and within a column of the BOM matrix columns for the another product.

2. The method according to claim 1, wherein the processing unit further locates each of the component rows within the BOM matrix relative to others of the component rows within the BOM matrix as a function of an order of the components that is determined by one of a depth-priority search and a width-priority search of components of the BOM list of the identified assembly of the selected product.

3. The method according to claim 1, wherein the step of the processing unit breaking down the BOM list into the new BOM graph structure comprises representing the component nodes by a linked list and a component-units-number array that stores the numbers of units of each component corresponding to respective nodes in the linked list.

4. The method of claim 1, further comprising:
integrating computer-readable program code into a computer system comprising the processing unit, a computer readable memory and a computer readable tangible storage medium;
wherein the computer readable program code is embodied on the computer readable tangible storage medium and comprises instructions that, when executed by the processing unit via the computer readable memory, cause the processing unit to perform the steps of determining whether or not the BOM list of the identified assembly is already broken down into the first BOM graph structure, breaking down the BOM list of the identified assembly into the new BOM graph structure in response to determining that the BOM list of the identified assembly is not broken down into the first BOM graph structure, and in response to determining that the BOM list of the identified assembly is already broken down into the first BOM graph structure, adding the numbers of units of each of the components nodes of the first BOM graph structure to the numbers of units of the respective corresponding ones of the components for the selected product that are stored in the different respective component BOM matrix row positions.

5. A system, comprising:
a processing unit in communication with a computer readable memory and a tangible computer-readable storage medium;
wherein the processing unit, when executing program instructions stored on the tangible computer-readable storage medium via the computer readable memory:
determines whether or not a bill-of-materials (BOM) list of an assembly that is identified as an assembly within a selected product is already broken down into a first BOM graph structure for another product comprising an identified assembly node, and a plurality of component nodes each depending from the identified assembly node and representing different components of the identified assembly and comprising respective numbers of units of each of the plurality of components within the identified assembly;
in response to determining that the BOM list of the identified assembly is not broken down into the first BOM graph structure, breaks down the BOM list of the identified assembly into a new BOM graph structure comprising a product node that represents the selected product and the identified assembly node depending from the product node and a plurality of component nodes each depending from the identified assembly node and representing different components of the identified assembly and comprising respective numbers of units of each of the plurality of components within the identified assembly, and stores respective numbers of units of each of the components nodes in a BOM matrix within different respective component row positions within a column of the BOM matrix for the selected product, wherein the BOM matrix comprises rows for the identified assembly and for each of the components, and columns for each of a plurality of products that include the specified selected product; and
in response to determining that the BOM list of the identified assembly is already broken down into the first BOM graph structure, adds the numbers of units of each of the components nodes of the first BOM graph structure to numbers of units of respective corresponding ones of the components for the selected product that are stored in the different respective component BOM matrix row positions within the BOM matrix column for the selected product, and within a column of the BOM matrix columns for the another product.

6. The system of claim 5, wherein the processing unit, when executing program the instructions stored on the tangible computer-readable storage medium via the computer readable memory, further locates each of the component rows within the BOM matrix relative to others of the component rows within the BOM matrix as a function of an order of the components that is determined by one of a depth-priority search and a width-priority search of components of the BOM list of the identified assembly of the selected product.

7. The system of claim 5, wherein the processing unit, when executing program the instructions stored on the tangible computer-readable storage medium via the computer readable memory further breaks down the BOM list into the new BOM graph structure by representing the component nodes by a linked list and a component-units-number array that stores the numbers of units of each component corresponding to respective nodes in the linked list.

8. An article of manufacture, comprising:
a computer readable tangible storage medium having computer readable program code embodied therewith, the computer readable program code comprising instructions that, when executed by a computer processing unit, causes the computer processing unit to determine whether or not a bill-of-materials (BOM) list of an assembly that is identified as an assembly within a selected product is already broken down into a first BOM graph structure for another product comprising an identified assembly node, and a plurality of component nodes each depending from the identified assembly node and representing different components of the identified assembly and comprising respective numbers of units of each of the plurality of components within the identified assembly;

in response to determining that the BOM list of the identified assembly is not broken down into the first BOM graph structure, break down the BOM list of the identified assembly into a new BOM graph structure comprising a product node that represents the selected product and the identified assembly node depending from the product node and a plurality of component nodes each depending from the identified assembly node and representing different components of the identified assembly and comprising respective numbers of units of each of the plurality of components within the identified assembly, and store respective numbers of units of each of the components nodes in a BOM matrix within different respective component row positions within a column of the BOM matrix for the selected product, wherein the BOM matrix comprises rows for the identified assembly and for each of the components, and columns for each of a plurality of products that include the specified selected product; and in response to determining that the BOM list of the identified assembly is already broken down into the first BOM graph structure, add the numbers of units of each of the components nodes of the first BOM graph structure to numbers of units of respective corresponding ones of the components for the selected product that are stored in the different respective component row positions within the BOM matrix column for the selected product, and within a column of the BOM matrix columns for the another product.

9. The article of manufacture of claim 8, wherein the computer readable program code instructions, when executed by the computer processing unit, further cause the computer processing unit to locate each of the component rows within the BOM matrix relative to others of the component rows within the BOM matrix as a function of an order of the components that is determined by one of a depth-priority search and a width-priority search of components of the BOM list of the identified assembly of the selected product.

10. The article of manufacture of claim 9, wherein the computer readable program code instructions, when executed by the computer processing unit, further cause the computer processing unit to break down the BOM list into the new BOM graph structure by representing the component nodes by a linked list and a component-units-number array that stores the numbers of units of each component corresponding to respective nodes in the linked list.

* * * * *